(12) United States Patent
Fujino et al.

(10) Patent No.: US 10,496,349 B2
(45) Date of Patent: Dec. 3, 2019

(54) PROFILE ADJUSTMENT SYSTEM, PROFILE ADJUSTMENT DEVICE, AND PROFILE ADJUSTMENT METHOD

(71) Applicant: SEIKO EPSON CORPORATION, Tokyo (JP)

(72) Inventors: Makoto Fujino, Nagano (JP); Katsuyuki Tanaka, Nagano (JP); Takahiro Kamada, Nagano (JP); Masaki Kimura, Nagano (JP); Kenji Fukasawa, Nagano (JP); Kenji Matsuzaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/108,546

(22) Filed: Aug. 22, 2018

(65) Prior Publication Data

US 2019/0068840 A1 Feb. 28, 2019

(30) Foreign Application Priority Data

Aug. 23, 2017 (JP) ................... 2017-160213

(51) Int. Cl.
*G06F 3/14* (2006.01)
*H04N 1/60* (2006.01)
*H04N 1/54* (2006.01)

(52) U.S. Cl.
CPC ............. *G06F 3/14* (2013.01); *H04N 1/54* (2013.01); *H04N 1/603* (2013.01); *H04N 1/6008* (2013.01)

(58) Field of Classification Search
None
See application file for complete search history.

(56) References Cited

U.S. PATENT DOCUMENTS

| 2003/0048464 | A1 | 3/2003 | Yamada et al. |
| 2008/0062193 | A1* | 3/2008 | Olson .................. H04N 1/6011 345/591 |
| 2015/0070717 | A1 | 3/2015 | Teraue |

FOREIGN PATENT DOCUMENTS

| JP | 2003-030639 A | 1/2003 |
| JP | 2004-056574 A | 2/2004 |
| JP | 4347435 B2 | 10/2009 |
| JP | 2015-053579 A | 3/2015 |
| JP | 5760649 B2 | 8/2015 |
| JP | 2016-158050 A | 9/2016 |
| JP | 2016-213646 A | 12/2016 |

* cited by examiner

*Primary Examiner* — Barbara D Reinier
(74) *Attorney, Agent, or Firm* — Global IP Counselors, LLP

(57) ABSTRACT

A profile adjustment system adjusts a profile to be used for converting a coordinate value in a color space, based on an adjustment target at an adjustment point indicating a color to be adjusted. The profile adjustment system includes a coordinate receiving unit configured to display on a display unit an input field for coordinates of the adjustment point, and to receive an input of the coordinates of the adjustment point, and a color display processing unit configured to display on the display unit a color corresponding to the coordinates, the input of which has been received, in association with displaying of the coordinates.

14 Claims, 29 Drawing Sheets

| |
|---|
| (a-1) SINGLE PROFILE IS USED: ADJUSTMENT SUBJECT IS INPUT PROFILE<br><br>CurrentOut = $f_{icc}$(InputProfile, A2B, Input) |
| (a-2) SINGLE PROFILE IS USED: ADJUSTMENT SUBJECT IS OUTPUT PROFILE<br><br>CurrentOut = $f_{icc}$(OutputProfile, B2A, Input) |
| (a-3) SINGLE PROFILE IS USED: ADJUSTMENT SUBJECT IS DEVICE LINK PROFILE<br><br>CurrentOut = $f_{icc}$(DLProfile, A2B0, Input) |
| (b-1) PROFILES ARE USED IN COMBINATION: ADJUSTMENT SUBJECT IS INPUT PROFILE<br><br>CurrentOut = $f_{icc}$(OutputProfile, B2A, $f_{icc}$(InputProfile, A2B, Input)) |
| (b-2) PROFILES ARE USED IN COMBINATION: ADJUSTMENT SUBJECT IS OUTPUT PROFILE<br><br>CurrentOut = $f_{icc}$(OutputProfile, B2A, $f_{icc}$(InputProfile, A2B, Input)) |

InputProfile REPRESENTS INPUT PROFILE,
OutputProfile REPRESENTS OUTPUT PROFILE,
DLProfile REPRESENTS DEVICE LINK PROFILE,
$f_{icc}$ REPRESENTS COLOR CONVERSION USING ICC PROFILE,
FIRST ARGUMENT REPRESENTS PROFILE NAME,
SECOND ARGUMENT A2B REPRESENTS CONVERSION FROM DEVICE COLOR TO DEVICE INDEPENDENT COLOR, SECOND ARGUMENT B2A RESPRESENTS CONVERSION FROM DEVICE INDEPENDENT COLOR TO DEVICE COLOR,
SECOND ARGUMENT A2B0 REPRESENTS CONVERSION USING DEVICE LINK TABLE, AND THIRD ARGUMENT REPRESENTS INPUT VALUE (SUCH AS CMYK, RGB, OR Lab) AT ADJUSTMENT POINT.

Fig. 13

(b-1) INPUT PROFILE IS DESIGNATED WITH INPUT AND OUTPUT PROFILES COMBINED
(b-1-1) INPUT COLOR SPACE IS SELECTED FOR ADJUSTMENT SUBJECT COLOR SPACE

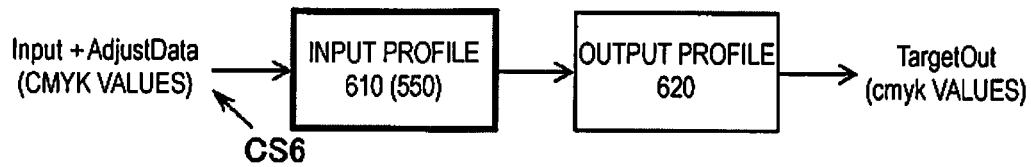

Fig. 15A (b-1) INPUT PROFILE IS DESIGNATED WITH INPUT AND OUTPUT PROFILES COMBINED
(b-1-2) OUTPUT COLOR SPACE IS SELECTED FOR ADJUSTMENT SUBJECT COLOR SPACE

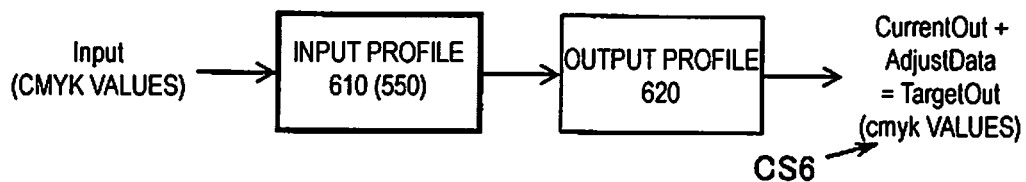

Fig. 15B (b-1) INPUT PROFILE IS DESIGNATED WITH INPUT AND OUTPUT PROFILES COMBINED
(b-1-3) PCS IS SELECTED FOR ADJUSTMENT SUBJECT COLOR SPACE

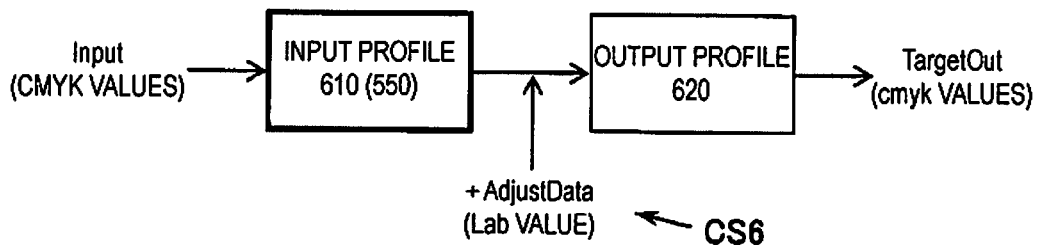

Fig. 15C (a-1) SINGLE PROFILE IS USED: ADJUSTMENT SUBJECT IS INPUT PROFILE (a-1-1) INPUT COLOR SPACE IS SELECTED FOR ADJUSTMENT SUBJECT COLOR SPACE
  TargetOut = $f_{icc}$(InputProfile, A2B, Input + AdjustData)
(a-1-2) OUTPUT COLOR SPACE IS SELECTED FOR ADJUSTMENT SUBJECT COLOR SPACE
  TargetOut = $f_{icc}$(InputProfile, A2B, Input) + AdjustData

---

(a-2) SINGLE PROFILE IS USED: ADJUSTMENT SUBJECT IS OUTPUT PROFILE (a-2-1) INPUT COLOR SPACE IS SELECTED FOR ADJUSTMENT SUBJECT COLOR SPACE
  TargetOut = $f_{icc}$(OutputProfile, B2A, Input + AdjustData)
(a-2-2) OUTPUT COLOR SPACE IS SELECTED FOR ADJUSTMENT SUBJECT COLOR SPACE
  TargetOut = $f_{icc}$(OutputProfile, B2A, Input) + AdjustData

---

(a-3) SINGLE PROFILE IS USED: ADJUSTMENT SUBJECT IS DEVICE LINK PROFILE (a-3-1) INPUT COLOR SPACE IS SELECTED FOR ADJUSTMENT SUBJECT COLOR SPACE
  TargetOut = $f_{icc}$(DLProfile, A2B0, Input + AdjustData)
(a-3-2) OUTPUT COLOR SPACE IS SELECTED FOR ADJUSTMENT SUBJECT COLOR SPACE
  TargetOut = $f_{icc}$(DLProfile, A2B0, Input) + AdjustData

---

(b-1) PROFILES ARE USED IN COMBINATION: ADJUSTMENT SUBJECT IS INPUT PROFILE (b-1-1) INPUT COLOR SPACE IS SELECTED FOR ADJUSTMENT SUBJECT COLOR SPACE
  TargetOut
  = $f_{icc}$(OutputProfile, B2A, $f_{icc}$(InputProfile, A2B, Input + AdjustData))
(b-1-2) OUTPUT COLOR SPACE IS SELECTED FOR ADJUSTMENT SUBJECT COLOR SPACE
  TargetOut
  = $f_{icc}$(OutputProfile, B2A, $f_{icc}$(InputProfile, A2B, Input)) + AdjustData
(b-1-3) PCS IS SELECTED FOR ADJUSTMENT SUBJECT COLOR SPACE
  TargetOut
  = $f_{icc}$(OutputProfile, B2A, $f_{icc}$(InputProfile, A2B, Input) + AdjustData)

---

(b-2) PROFILES ARE USED IN COMBINATION: ADJUSTMENT SUBJECT IS OUTPUT PROFILE (SAME AS IN (b-1))

Fig. 16

(b-1) INPUT PROFILE IS DESIGNATED WITH INPUT AND OUTPUT PROFILES COMBINED (b-2) OUTPUT PROFILE IS DESIGNATED WITH INPUT AND OUTPUT PROFILES COMBINED

| |
|---|
| (a-1) SINGLE PROFILE IS USED: ADJUSTMENT SUBJECT IS INPUT PROFILE<br><br>Input_P = Input<br>TargetOut_P = TargetOut |
| (a-2) SINGLE PROFILE IS USED: ADJUSTMENT SUBJECT IS OUTPUT PROFILE<br><br>(SAME AS IN (a-1)) |
| (a-3) SINGLE PROFILE IS USED: ADJUSTMENT SUBJECT IS DEVICE LINK PROFILE<br><br>(SAME AS IN (a-1)) |
| (b-1) PROFILES ARE USED IN COMBINATION: ADJUSTMENT SUBJECT IS INPUT PROFILE<br><br>Input_P = Input<br>TargetOut_P = $f_{icc}$(OutputProfile, A2B, TargetOut) |
| (b-2) PROFILES ARE USED IN COMBINATION: ADJUSTMENT SUBJECT IS OUTPUT PROFILE<br><br>Input_P = $f_{icc}$(InputProfile, A2B, Input)<br>TargetOut_P = TargetOut |

Fig. 18

| ID | C | M | Y | K | before L | before a | before b | After L | After a | After b |
|----|----|----|----|----|------|------|-------|------|------|-------|
| 1 | 54 | 70 | 79 | 16 | 37.6 | 13.6 | 15.6 | 38.1 | 13.2 | 15.3 |
| 2 | 15 | 42 | 43 | 0 | 65.8 | 15.8 | 17.6 | 66.1 | 15.9 | 17.4 |
| 3 | 49 | 45 | 5 | 0 | 55.1 | 8.7 | -23.6 | 55.3 | 9.2 | -23.3 |
| 4 | 57 | 0 | 37 | 0 | 69.4 | -32.6 | 0.1 | 69.4 | -33.1 | -0.1 |
| 5 | 0 | 60 | 93 | 0 | 60.5 | 34.1 | 56.9 | 60.7 | 34.3 | 56.9 |
| 6 | 78 | 62 | 0 | 0 | 39.2 | 8.9 | -43.0 | 39.3 | 8.5 | -42.7 |
| 7 |   |   |   |   |      |      |       |      |      |       |

Fig. 21

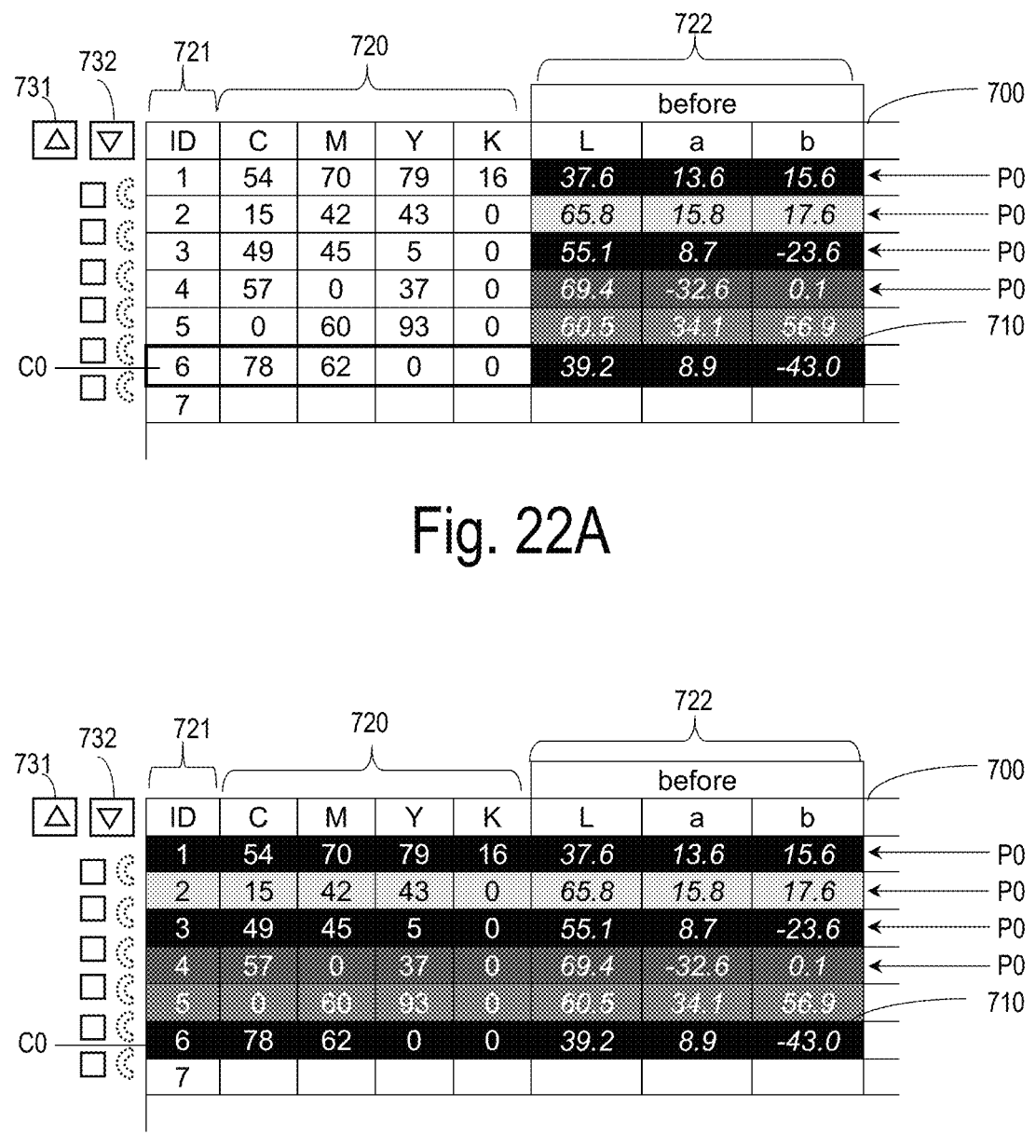

| ID | C | M | Y | K | L | a | b |
|---|---|---|---|---|---|---|---|
| 1 | 54 | 70 | 79 | 16 | 37.6 | 13.6 | 15.6 |
| 2 | 15 | 42 | 43 | 0 | 65.8 | 15.8 | 17.6 |
| 3 | 49 | 45 | 5 | 0 | 55.1 | 8.7 | -23.6 |
| 4 | 57 | 0 | 37 | 0 | 69.4 | -32.6 | 0.1 |
| 5 | 0 | 60 | 93 | 0 | 60.5 | 34.1 | 56.9 |
| 6 | 78 | 62 | 0 | 0 | 39.2 | 8.9 | -43.0 |
| 7 |   |   |   |   |   |   |   |

Fig. 22A

| ID | C | M | Y | K | L | a | b |
|---|---|---|---|---|---|---|---|
| 1 | 54 | 70 | 79 | 16 | 37.6 | 13.6 | 15.6 |
| 2 | 15 | 42 | 43 | 0 | 65.8 | 15.8 | 17.6 |
| 3 | 49 | 45 | 5 | 0 | 55.1 | 8.7 | -23.6 |
| 4 | 57 | 0 | 37 | 0 | 69.4 | -32.6 | 0.1 |
| 5 | 0 | 60 | 93 | 0 | 60.5 | 34.1 | 56.9 |
| 6 | 78 | 62 | 0 | 0 | 39.2 | 8.9 | -43.0 |
| 7 |   |   |   |   |   |   |   |

| Patch No. | DEVICE COLOR | | | | TARGET CHROMA VALUE | | | | | SIMULATION VALUE (OR ACTUALLY MEASURED VALUE) | | | | |
|---|---|---|---|---|---|---|---|---|---|---|---|---|---|---|
| | C | M | Y | K | L* | a* | b* | C* | H | L | a | b | ΔE00 | |
| 3 | 0 | 0 | 0 | 3 | 17 | 81.1 | 0.5 | -3.9 | 3.9 | -63.0 | 81.5 | 2.1 | -2.8 | 2.6 |
| 5 | 9 | 2 | 0 | 0 | 35 | 83.8 | -1.2 | -6.5 | 6.6 | -100.5 | 66.7 | -1.7 | -6.9 | 2.5 |
| 62 | 0 | 0 | 98 | 78 | 0 | 48.1 | 60.5 | 38.8 | 77.7 | 28.3 | 47.5 | 70.6 | 39.7 | 1.7 |
| 24 | 69 | 0 | 0 | 16 | 0 | 51.2 | -17.4 | -44.1 | 47.4 | -111.8 | 51.4 | -14.8 | -44.9 | 1.5 |
| 64 | 0 | 71 | 0 | 28 | 0 | 59.9 | 65.5 | 9.7 | 66.2 | 8.4 | 61.4 | 64.4 | 10.4 | 1.4 |
| 45 | 0 | 25 | 100 | 0 | 0 | 78.5 | 17.7 | 77.8 | 79.8 | 77.2 | 79.8 | 18.3 | 77.1 | 1.2 |
| 50 | 0 | 30 | 0 | 90 | 23 | 68.3 | 12.4 | 49.9 | 51.4 | 76.1 | 67.5 | 13.2 | 49.4 | 1.1 |
| 25 | 0 | 54 | 0 | 98 | 11 | 28.6 | -24.2 | -0.3 | 24.2 | -179.3 | 29.7 | -24.0 | -1.2 | 1.1 |
| 54 | 94 | 66 | 0 | 96 | 0 | 62.9 | 52.0 | 59.2 | 78.8 | 46.7 | 62.9 | 52.7 | 51.5 | 0.7 |
| 8 | 0 | 0 | 50 | 50 | 100 | 22.8 | 0.6 | -4.0 | 4.0 | -81.3 | 22.9 | 0.2 | -3.9 | 0.6 |
| 10 | 50 | 100 | 72 | 0 | 40 | 23.3 | 7.7 | -35.0 | 35.8 | -77.8 | 23.2 | 8.7 | -36.8 | 0.5 |
| 48 | 0 | 0 | 3 | 16 | 0 | 91.1 | 0.3 | 6.4 | 6.4 | 87.4 | 91.7 | 0.4 | 6.4 | 0.4 |
| 63 | 20 | 100 | 100 | 80 | 73 | 26.1 | 28.0 | 7.4 | 28.9 | 14.8 | 28.6 | 28.9 | 6.9 | 2.0 |
| 14 | 95 | 76 | 0 | 0 | 79 | 19.9 | 0.2 | -18.1 | 16.1 | -89.2 | 22.4 | 0.4 | -17.7 | 2.0 |
| 67 | 96 | 88 | 22 | 22 | 22.3 | 15.1 | -28.4 | 32.2 | -62.1 | 24.1 | 14.2 | -29.8 | 1.9 | |

Fig. 29

PROFILE ADJUSTMENT SYSTEM, PROFILE ADJUSTMENT DEVICE, AND PROFILE ADJUSTMENT METHOD

The present application is based on and claims priority from JP Application Serial Number 2017-160213, filed Aug. 23, 2017, the disclosure of which is hereby incorporated by reference herein in its entirety.

BACKGROUND

1. Technical Field

The disclosure relates to a technique of adjusting a profile used for converting a coordinate value in a color space.

2. Related Art

International Color Consortium (ICC) profile is data representing a correspondence relationship between a device dependent color and a device independent color of color devices including printers (offset printers, for example) and inkjet printers. Such a device dependent color of the printer and the inkjet printer is represented by CMYK values indicating used amounts of cyan (C), magenta (M), yellow (Y), and black (K). The device independent color is represented by a chroma value in the International Commission on Illumination (CIE) L*a*b*color space (hereinafter, referred to as Lab values with "*" omitted) that is a device independent color space, or a chroma value in the CIE XYZ color space.

Here, the ICC profile of a printer is referred to as an input profile and the ICC profile of an inkjet printer is referred to as an output profile. When the CMYK values (referred to as $CMYK_t$ values) of a printer is converted into chroma values (for example, Lab values) in a Profile Connection Space (PCS) based on the input profile, the chroma values can be converted into CMYK values (referred to as $CMYK_p$ values) based on the output profile. A device link profile obtained by combining the input profile and the output profile is also used. When printing is performed according to the $CMYK_p$ values thus obtained, the inkjet printer is capable of reproducing colors close to the colors of the printer. In a case where an expected color cannot be reproduced, the ICC profile is corrected to improve conversion accuracy of a color to be adjusted. For example, the ICC profile can be corrected by inputting an output value (numerical value) associated with the input value on an edit screen for the ICC profile.

Note that JP-A-2016-213646 discloses a color substitution table edit screen for inputting CMYK values (numerical value) associated with input colors of red (R), green (G), and blue (B).

With a numerical value input to correct the ICC profile, it is difficult to instantly figure out a color as a result of the correction. In particular, in a case where a plurality of colors are edited, it may be difficult to learn an overview of the entire editing operation.

The above-described cases are not limited to cases where the profile is adjusted for printers, and may also occur in cases where the profile is adjusted for various color devices.

The disclosure provides a technique for facilitating an adjustment operation for a profile to be used for converting a coordinate value in a color space.

SUMMARY

According to one aspect of the disclosure, the disclosure relates to a profile adjustment system for adjusting a profile used for converting a coordinate value in a color space, based on an adjustment target at an adjustment point indicating a color to be adjusted. The profile adjustment system includes a coordinate receiving unit configured to display on a display unit an input field for coordinates of the adjustment point, and to receive an input of the coordinates of the adjustment point, and a color display processing unit configured to display on the display unit a color corresponding to the coordinates, the input of which has been received, in association with displaying of the coordinates.

According to another aspect of the disclosure, the disclosure also relates to a profile adjustment device for adjusting a profile to be used for converting a coordinate value in a color space, based on an adjustment target at an adjustment point indicating a color to be adjusted. The profile adjustment device includes a coordinate receiving unit configured to output display data in an input field for coordinates of the adjustment point, and to receive an input of the coordinates of the adjustment point, and a color display processing unit configured to output display data to associate a color corresponding to the coordinates, the input of which has been received, with displaying of the coordinates.

According to yet another aspect of the disclosure, a profile adjustment method includes processes corresponding to components of the profile adjustment system described above.

According to further another aspect of the disclosure, a profile adjustment program causes a computer to implement functions corresponding to components of the profile adjustment system described above.

The disclosure provides a technique for facilitating an adjustment operation for a profile used for converting a coordinate value in a color space.

BRIEF DESCRIPTION OF THE DRAWINGS

Embodiments of the disclosure will be described with reference to the accompanying drawings, wherein like numbers reference like elements.

FIG. 13 is a schematic diagram illustrating example formulae for calculating the current output value.

FIGS. 15A to 15C are schematic diagrams illustrating an example where the target output value in accordance with the color space to be adjusted is calculated.

FIG. 16 is a schematic diagram illustrating example formulae for calculating a target output value.

FIG. 18 is a schematic diagram illustrating example formulae for calculating the input value and the adjustment target value of the profile to be adjusted.

FIG. 21 is a schematic diagram illustrating an example list including a chroma value before and after an adjustment.

FIGS. 22A and 22B are schematic diagrams each illustrating an example list in which positions where the colors are displayed are changed.

FIG. 27 is a schematic diagram illustrating an example of another list.

FIG. 28 is a schematic diagram illustrating an example where adjustment point information is rearranged in a color difference sequence.

FIG. 29 is a schematic diagram illustrating an example where adjustment point information is rearranged with a plurality of items combined.

DESCRIPTION OF EXEMPLARY EMBODIMENTS

Figure 1:
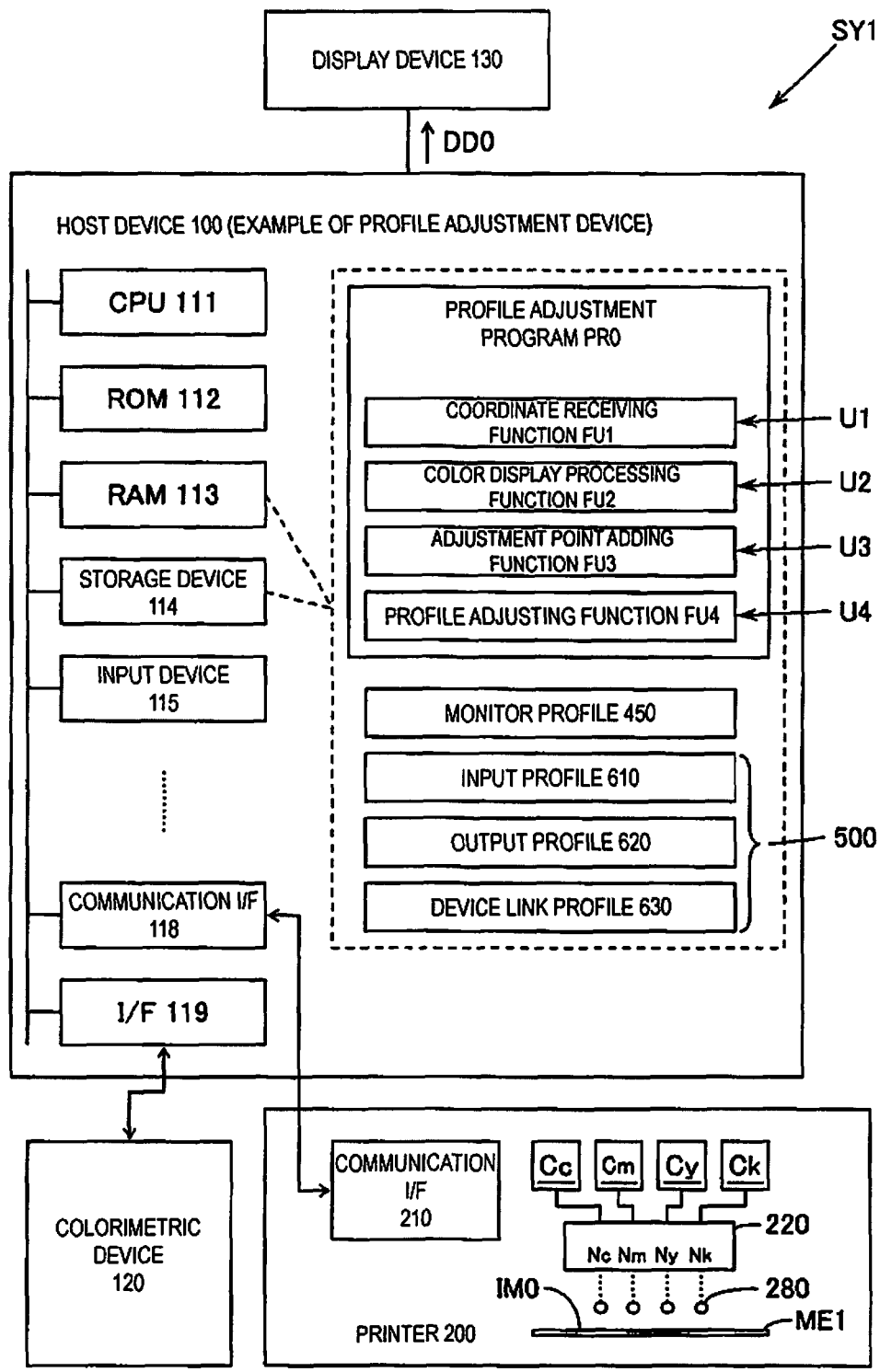
FIG. 1 is a block diagram illustrating an example configuration of a profile adjustment system.

Some exemplary embodiments of the disclosure are described below. It is noted that the exemplary embodiments described below are merely examples of the disclosure, and thus not all the features in the exemplary embodiments are necessarily required for the solution according to the disclosure.

1. OVERVIEW OF TECHNIQUES INCLUDED IN THE DISCLOSURE

An overview of techniques included in the disclosure is first described with reference to examples illustrated in FIGS. 1 to 29. The accompanying drawings illustrate schematic examples, and the scale in each direction illustrated in these drawings might vary. Thus, the drawings might be inconsistent in terms of dimensions. The components included in the techniques are not limited to specific examples denoted with reference numerals.

Aspect 1

A profile adjustment system SY1 according to one aspect of the present technique includes an adjustment of a profile 500 used for converting a coordinate value in a color space, based on an adjustment target T0 at an adjustment point P0 indicating a color to be adjusted. The profile adjustment system SY1 includes a coordinate receiving unit U1 and a color display processing unit U2. The coordinate receiving unit U1 is configured to display an input field 720 for coordinates of the adjustment point P0 on a display unit (a display device 130 for example), and to receive an input of the coordinates of the adjustment point P0. The color display processing unit U2 is configured to display a color C0 corresponding to the received coordinates on the display unit (130) in association with displaying of the coordinates.

In the aspect described above, the color C0, corresponding to the coordinates input for the adjustment point P0, is displayed on the display unit (130) in association with the coordinates. The user viewing the display can instinctively recognize the color to be adjusted together with the coordinates of the adjustment point P0. Thus, in one aspect, a profile adjustment system for facilitating an adjustment operation for a profile used for converting a coordinate value in a color space is provided.

Examples of the color space include a CMYK color space, a CMY color space, an RGB color space, a CIE Lab color space, a CIE XYZ color space, and the like. It is to be noted that R represents red, G represents green, and B represents blue.

The adjustment target may be represented by a coordinate value in the color space, or may be represented by a difference from the current coordinate value in the color space.

The coordinates of the adjustment point may be represented by a coordinate value in an input color space in the profile, a coordinate value of an output color space in the profile, or a coordinate value in a color space different from the input color space or the output color space.

Receiving of the input of the coordinates of the adjustment point includes receiving an operation of inputting the coordinate value directly in the input field, and receiving an operation of designating the coordinates in an area other than the input field and displaying the corresponding coordinate value in the input field.

The above remarks also apply to the following aspects.

Aspect 2

Figure 5:
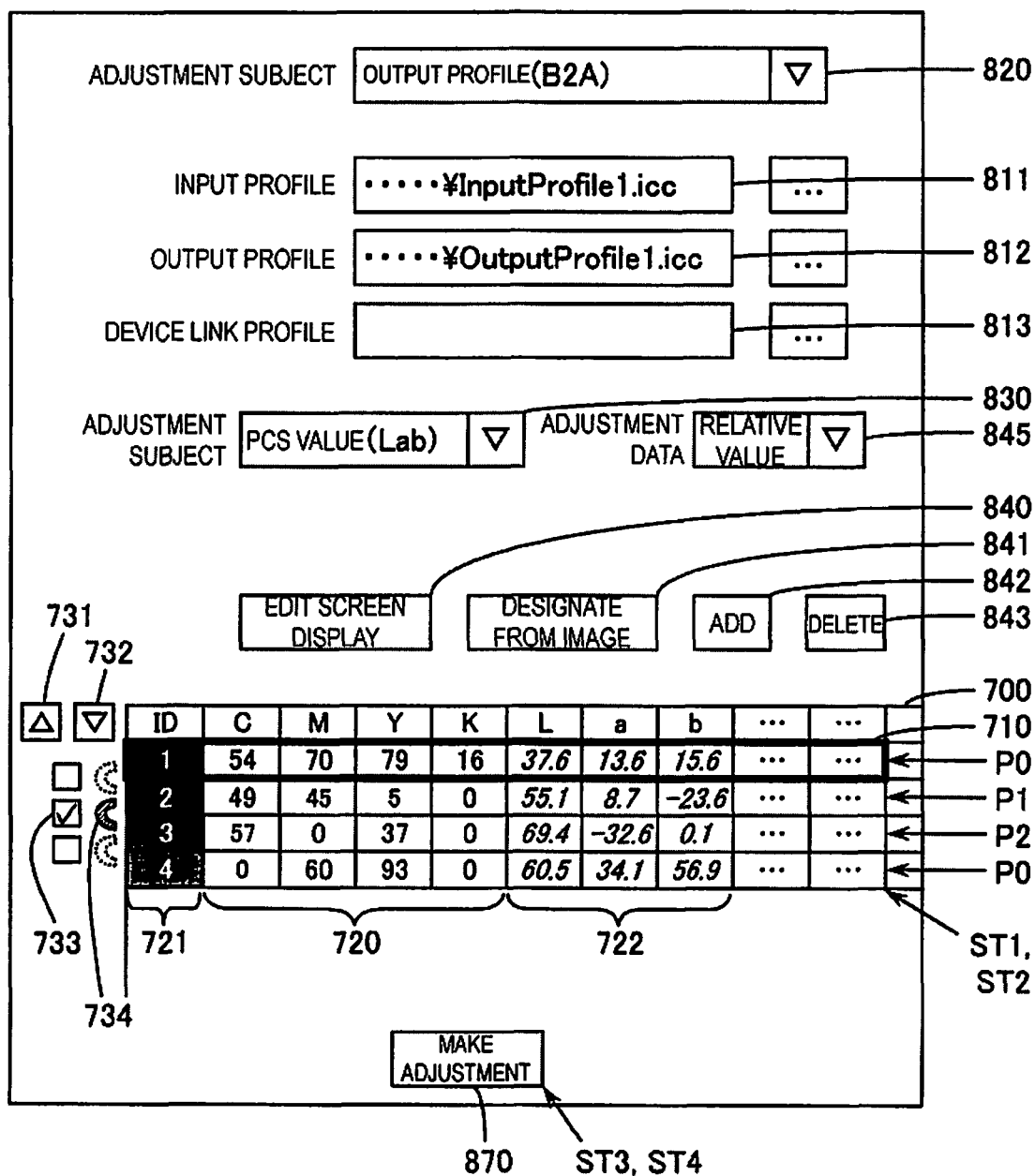
FIG. 5 is a schematic diagram illustrating an example user interface screen.

As in examples in FIG. 5 or the like, the coordinate receiving unit U1 displays, for the adjustment point P0, a list 700 of adjustment point information 710 at least including the coordinates of the adjustment point P0, on the display unit (130). This aspect enables the adjustment point information 710 including the coordinates of the adjustment point P0 to be recognized in the list 700, and thus provides a technique of further facilitating the profile adjustment operation.

The list 700 may or may not include the input field 720. The above remarks also apply to the following aspects.

Aspect 3

Figure 9:
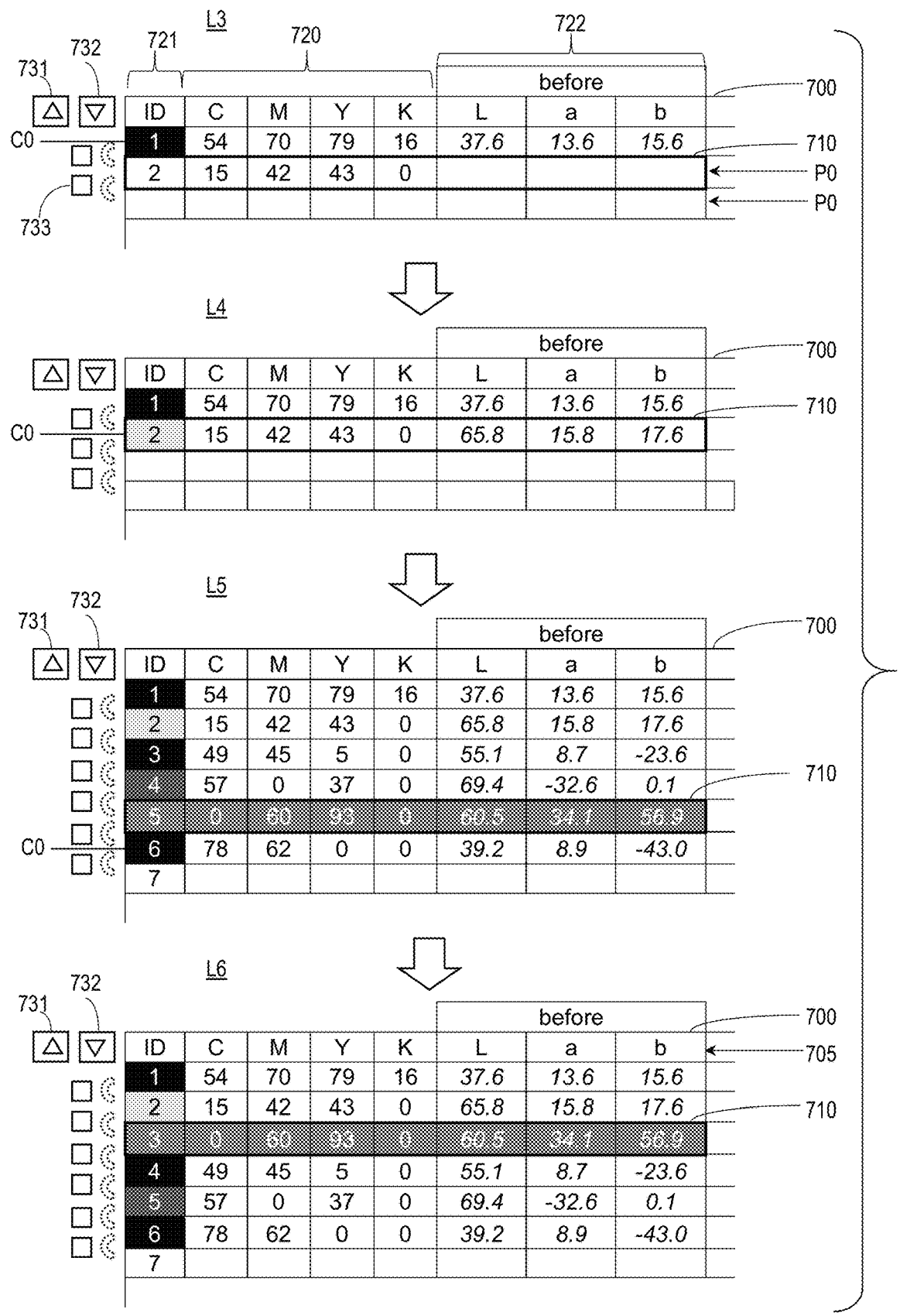
FIG. 9 is a schematic diagram illustrating an example change in a list.

As in examples illustrated in FIG. 9 and the like, the color display processing unit U2 displays the color C0 corresponding to the coordinates on a background of at least a part of the list 700. This aspect enables the relationship between the coordinates of the adjustment point P0 and the color to be adjusted to be more easily recognized, and thus provides a technique of further facilitating the profile adjustment operation.

Aspect 4

Figure 23:
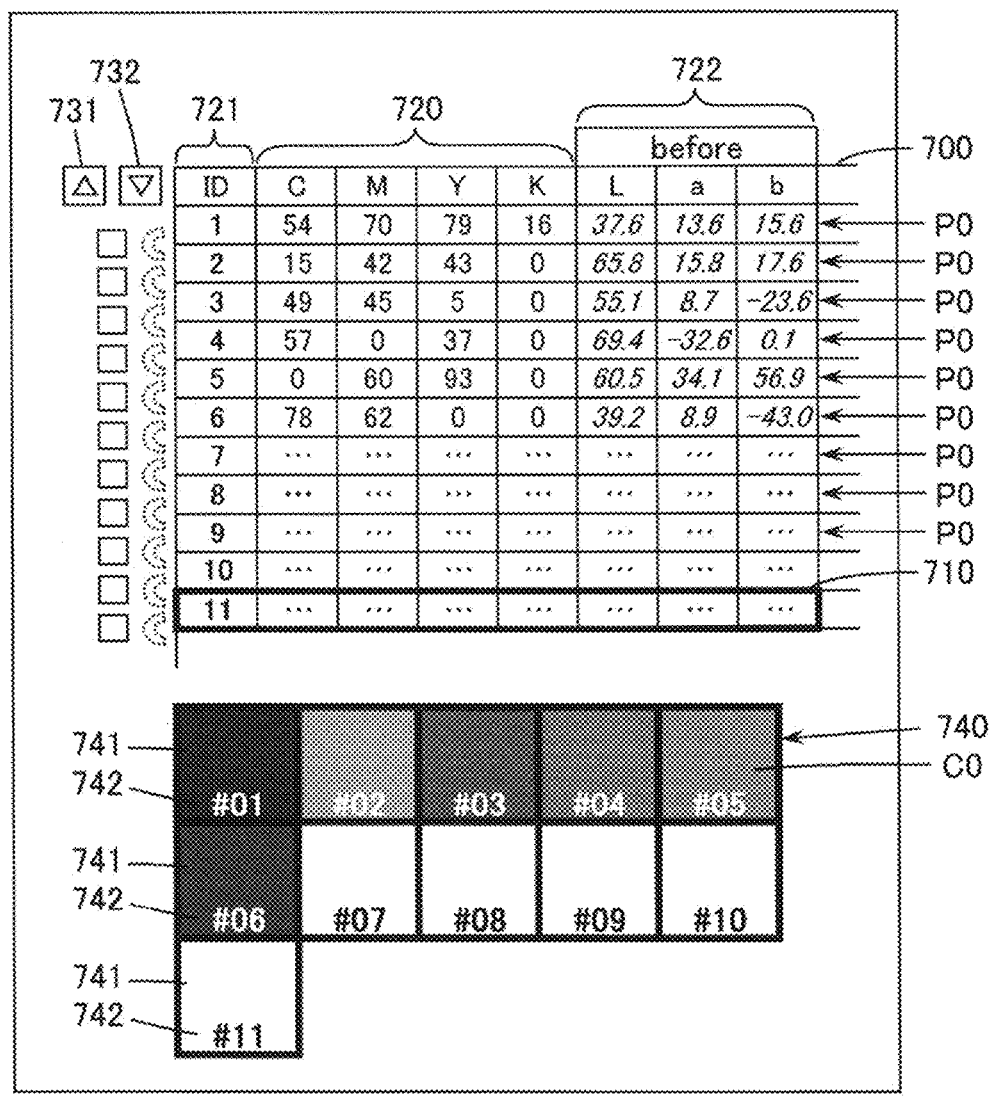
FIG. 23 is a schematic diagram illustrating an example where the colors are displayed outside the list.

As in an example illustrated in FIG. 23, the color display processing unit U2 displays the color C0 corresponding to the coordinates of the adjustment point P0 on the display unit (130), in association with identification information for identifying the adjustment point P0, separately from the list 700. For example, this aspect enables color display to stand out more than in a case where the color is displayed in the list 700, and thus provides a technique of further facilitating the profile adjustment operation.

Aspect 5

Figure 24:
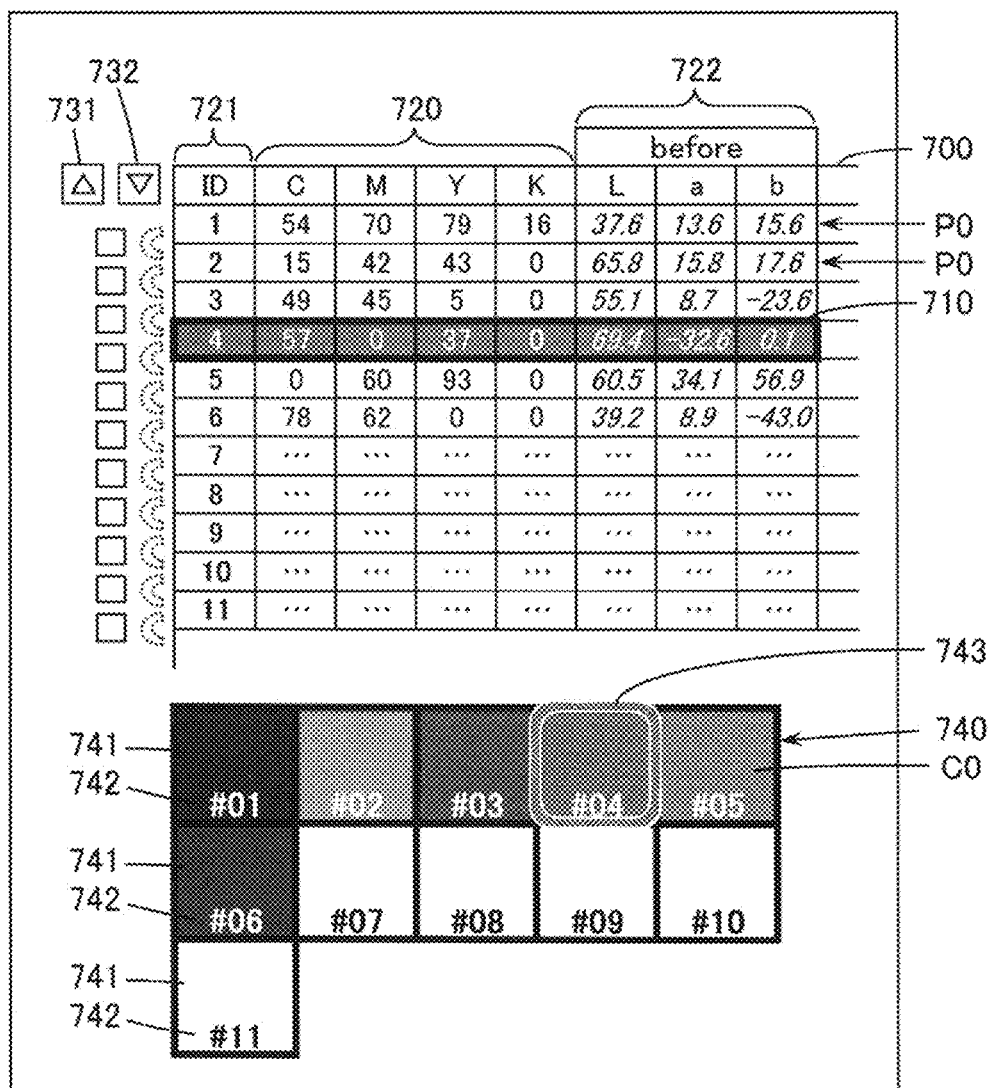
FIG. 24 is a schematic diagram illustrating an example where a display patch corresponding to an operated portion in the list is displayed in a distinguishable manner.

As in an example illustrated in FIG. 24, the color display processing unit U2 displays the color C0 corresponding to the coordinates in the adjustment point information 710 in an operated portion in the list 700 displayed on the display unit (130) to be distinguished from the other colors. This aspect enables the relationship between the adjustment point information 710 in the list 700 and the corresponding color C0 to be more easily understood, and thus can provide a technique of further facilitating the profile adjustment operation.

The color C0 displayed to be distinguished from the other colors may include being applied with a mark such as a frame, being displayed in a blinking manner, and being displayed in a pop-up manner. The above remarks also apply to the following aspects.

Aspect 6

Figure 25:
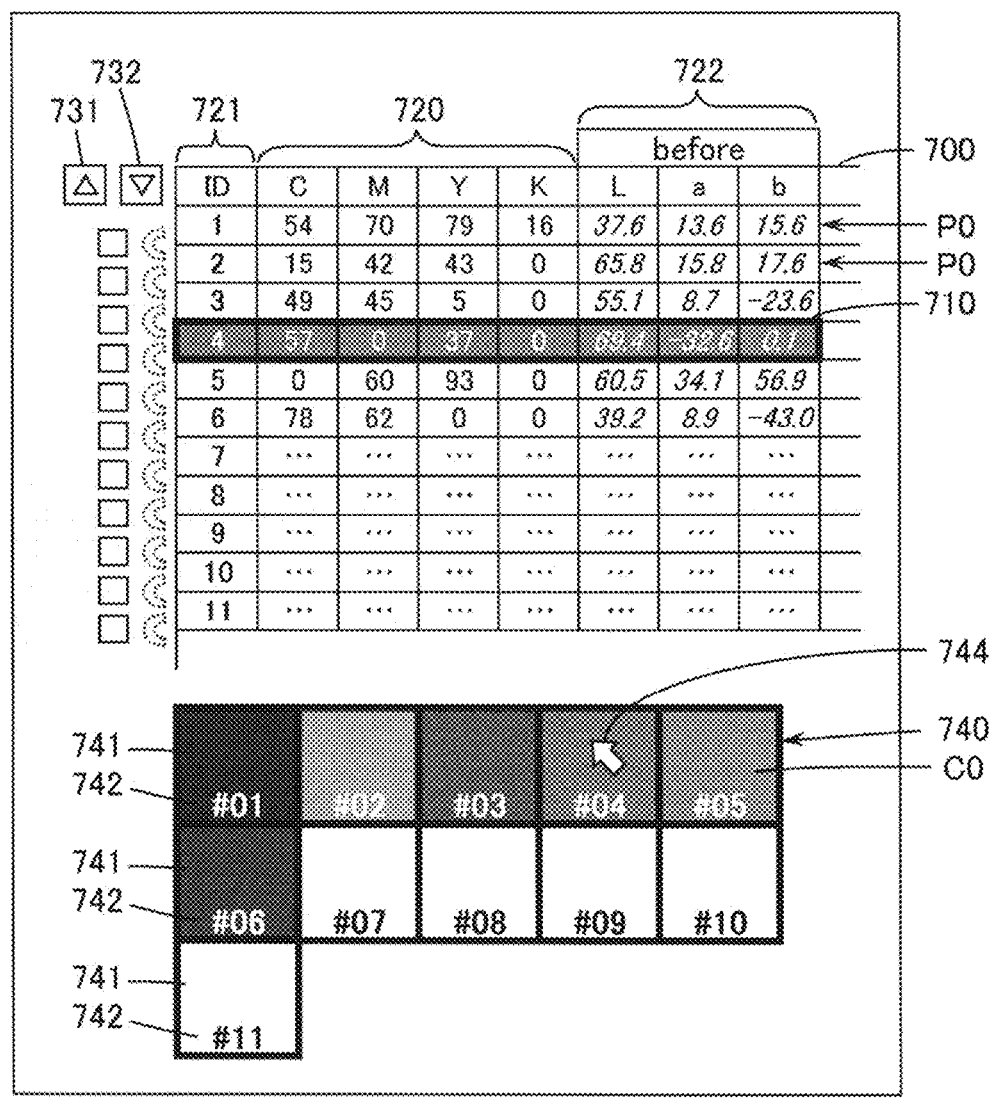
FIG. 25 is a schematic diagram illustrating an example where adjustment point information corresponding to an operated display patch in a color display area is displayed in a distinguishable manner.

As in an example illustrated in FIG. 25, the color display processing unit U2 may control displaying of the list 700 such that the adjustment point information 710 corresponding to the color at the operated portion, in the colors C0 corresponding to the coordinates of the adjustment point P0 displayed on the display unit (130), is distinguished from the other pieces of information. This aspect enables the relationship between the adjustment point information 710 in the list 700 and the corresponding color C0 to be more easily understood, and thus can provide a technique of further facilitating the profile adjustment operation.

The adjustment point information may be displayed to be distinguished from the other pieces of information by having a background color different from background colors for the other pieces of information, being provided with a mark such as a frame, or being displayed in a blinking manner, or the like. The above remarks also apply to the following aspects.

Aspect 7

Figure 7:
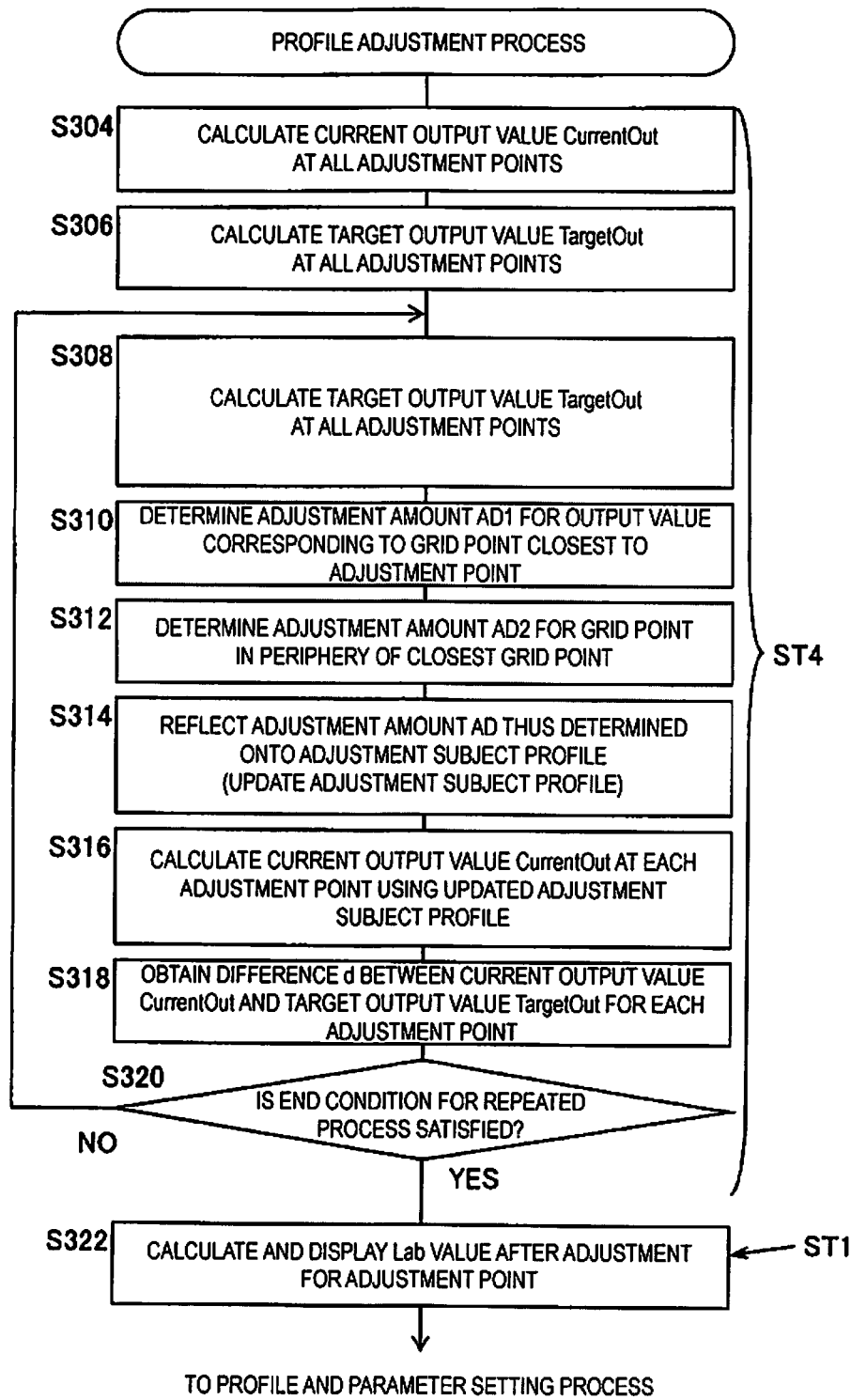
FIG. 7 is a flowchart illustrating an example profile adjustment process.

As in examples illustrated in FIGS. 1 and 7 and the like, the profile adjustment system SY1 may include a profile adjusting unit U4 configured to adjust the profile 500 based on the adjustment target T0 in the adjustment point P0. As in an example illustrated in FIG. 26, the color display processing unit U2 may display on the display unit (130) a color C0*b* corresponding to the coordinates of the adjustment point P0 before the profile adjusting unit U4 makes an adjustment, and a color C0*a* corresponding to the coordinates of the adjustment point P0 after the profile adjusting unit U4 makes the adjustment, in association with the identification information. This aspect enables the change in the color C0 corresponding to the adjustment point P0 before and after an adjustment of the profile 500 to be recognized, and thus can provide a technique of further facilitating the profile adjustment operation.

Aspect 8

Figure 10:
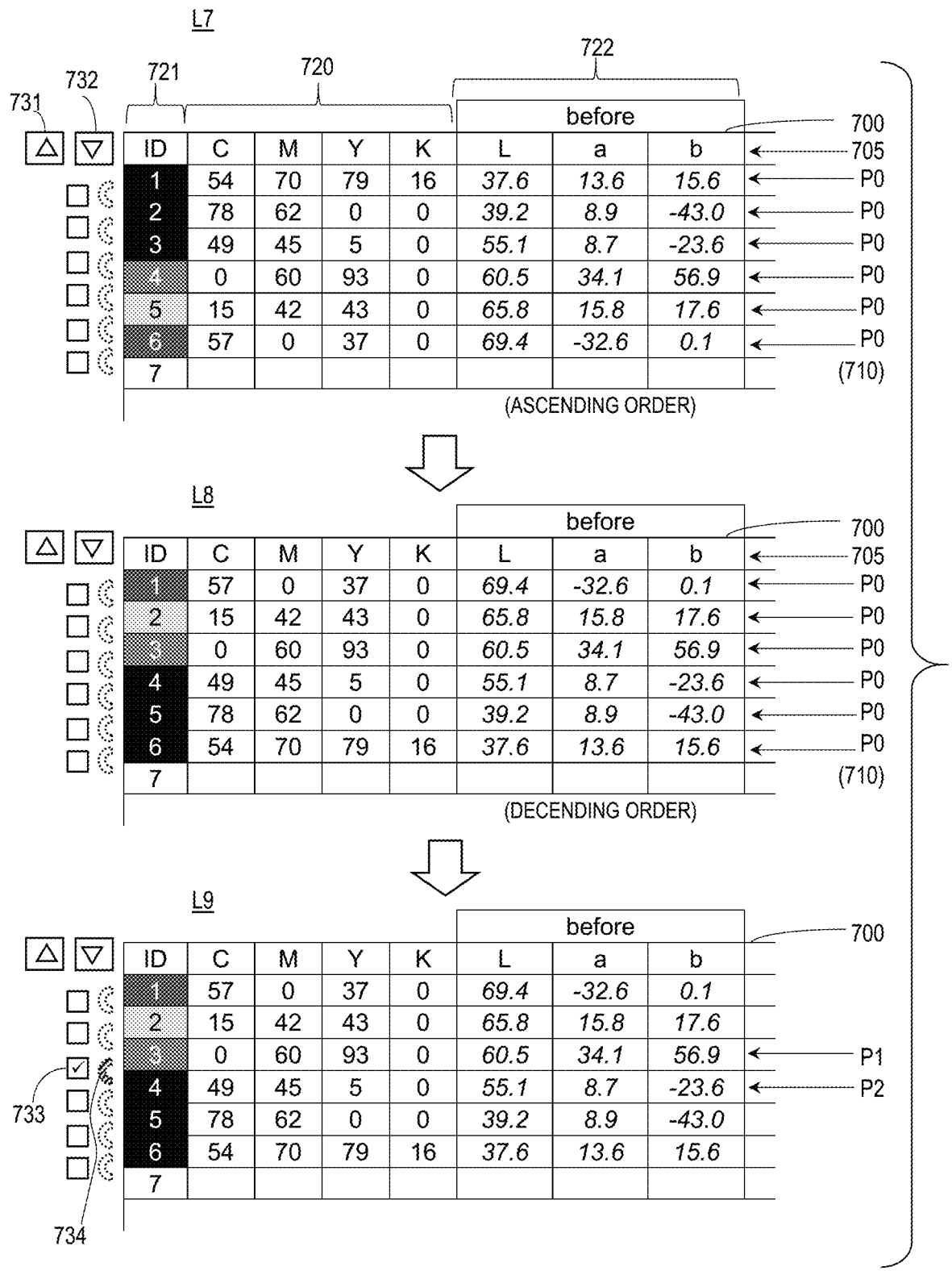
FIG. 10 is a schematic diagram illustrating an example change in a list.

As in examples illustrated in FIGS. 9, 10, and the like, the coordinate receiving unit U1 may receive an operation for changing a display sequence of the adjustment point information 710 included in the list 700, and may display on the display unit (130) the list 700 with the display sequence of the adjustment point information 710 having been changed according to the operation. This aspect enables the display sequence of the adjustment point information 710 in the list 700 to be changed, and thus can provide a technique of further facilitating the profile adjustment operation.

Aspect 9

As in examples illustrated in FIG. 10 and the like, the coordinate receiving unit U1 may receive an operation for linking a first adjustment point P1 at first coordinates and a second adjustment point P2 at second coordinates, in a plurality of the adjustment points P0 displayed in the list 700 (see a list L9 for example), and display on the display unit (130) link information 734 indicating that the first adjustment point P1 and the second adjustment point P2 are linked. As in examples illustrated in FIGS. 1 and 4 and the like, the profile adjustment system SY may include an adjustment point adding unit U3 configured to set a third adjustment point Q at third coordinates based on the first coordinates and the second coordinates. The profile adjustment system SY1 may further include a profile adjusting unit U4 configured to adjust the profile 500 based on adjustment data (the target T0 and an adjustment range A0, for example) indicating adjustment degrees on the first adjustment point P1, the second adjustment point P2, and the third adjustment point P3. With this aspect, when the user links the first adjustment point P1 and the second adjustment point P2 in the list 700, the third adjustment point Q at the third coordinates is automatically set, and the adjustment target T0 at the third adjustment point Q is also used for the adjustment of the profile 500. Thus, this aspect can provide a technique of improving a gradation characteristic of an output image.

The adjustment point P0 includes the first adjustment point P1, the second adjustment point P2, and the third adjustment point Q.

The adjustment range A0 described later includes a first adjustment range A1, a second adjustment range A2, and a third adjustment range A3.

The adjustment data includes an adjustment target at an adjustment point, an adjustment range having the adjustment point serving as the base point, and the like.

The above remarks also apply to the following aspects.

Aspect 10

As in examples illustrated in FIGS. 1 and 7 and the like, the profile adjustment system SY1 may include a profile adjusting unit U4 configured to adjust the profile 500 based on the adjustment target T0 in the adjustment point P0. As in an example illustrated in FIG. 21, the coordinate receiving unit U1 may display on the display unit (130), the list 700 including the adjustment point information 710 including a chroma value corresponding to the adjustment point P0 before the profile adjusting unit U4 makes an adjustment and a chroma value corresponding to the adjustment point P0 after the profile adjusting unit U4 makes the adjustment. This aspect enables the change in the chroma value corresponding to the adjustment point P0 before and after an adjustment of the profile 500 to be recognized, and thus can provide a technique of further facilitating the profile adjustment operation.

Aspect 11

A profile adjustment device (a host device 100, for example), according to one aspect of the present technique, adjusts a profile 500 used for converting a coordinate value in a color space, based on an adjustment target T0 at an adjustment point P0 indicating a color to be adjusted. The profile adjustment device includes a coordinate receiving unit U1 and a color display processing unit U2. The coordinate receiving unit U1 is configured to output display data DD0 on an input field 720 for coordinates of the adjustment point P0, and to receive an input of the coordinates of the adjustment point P0. The color display processing unit U2 is configured to output display data DD0 to associate a color C0 corresponding to the coordinates, the input of which has been received, with displaying of the coordinates. Thus, this aspect can provide a profile adjustment device for facilitating an adjustment operation for a profile used for converting a coordinate value in a color space.

The profile adjustment device may further include the profile adjusting unit U4 and the adjustment point adding unit U3.

Aspect 12

A profile adjustment method, according to one aspect of the present technique, includes a coordinate receiving step ST1 corresponding to the coordinate receiving unit U1 and a color display processing step ST2 corresponding to the color display processing unit U2. This aspect can provide a profile adjustment method for facilitating an adjustment operation for a profile used for converting a coordinate value in a color space.

The profile adjustment method may further include an profile adjusting step ST4 of corresponding to the profile adjusting unit U4 and an adjustment point adding step ST3 corresponding to the adjustment point adding unit U3.

Aspect 13

A profile adjustment program PR0, according to one aspect of the present technique, causes a computer to implement a coordinate receiving function FU1 corresponding to the coordinate receiving unit U1 and a color display processing function FU2 corresponding to the color display processing unit U2. This aspect can provide a profile adjustment program PR0 for facilitating an adjustment operation for a profile to be used for converting a coordinate value in a color space.

The profile adjustment program PR0 may further cause a computer to implement a profile adjustment function FU4 corresponding to the profile adjusting unit U4 and an adjustment point adding function FU3 corresponding to the adjustment point adding unit U3.

The technique is also applicable to a complex system including a profile adjustment device, a control method for a profile adjustment device, a control method for a complex system, a control program for a complex system, a computer-readable medium in which a profile adjustment program or the control program is recorded, and the like. The above-described device may be divided into a plurality of units.

2. SPECIFIC EXAMPLE OF CONFIGURATION OF PROFILE ADJUSTMENT SYSTEM

FIG. 1 schematically illustrates an example of the configuration of a profile adjustment system including a profile adjustment device. The profile adjustment system SY1 illustrated in FIG. 1 includes a host device 100 (an example of a profile adjustment device), a display device 130, a colorimetric device 120, and an inkjet printer 200. The host device 100 is coupled with a central processing unit (CPU) 111, a read-only memory (ROM) 112, a random access memory (RAM) 113, a storage device 114, an input device 115, interfaces (I/Fs) 118 and 119, and the like, for exchanging information with each other. The ROM 112, the RAM 113, and the storage device 114 are memories, and at least the ROM 112 and the RAM 113 are semiconductor memories. The display device 130 may be a liquid crystal display panel or the like.

The storage device 114 stores an operating system (OS) (not illustrated), a profile adjustment program PR0, and the like. Such programs are loaded onto the RAM 113 to be used for an adjustment process for the profile 500 as appropriate. An input profile 610, an output profile 620, and a device link profile 630 are collectively referred to as the profile 500 herein. For example, at least one of the RAM 113 or the storage device 114 stores various types of information including a monitor profile 450, the profile 500 that can be adjusted, an adjustment history (not illustrated), and the like. The profiles 610 to 630 that can be adjusted are collectively referred to as the profile 500 herein. In the monitor profile 450, correspondence relationships between coordinates (RGB values) in an RGB color space and coordinates (Lab values) in a Lab color space are defined, for example, according to standard RGB (sRGB). The storage device 114 may be a nonvolatile semiconductor memory such as a flash memory, a magnetic storage device such as a hard disk, or the like.

The input device 115 may be a pointing device, a hardware key such as a keyboard, a touch panel attached to a surface of a display panel, or the like. The communication I/F 118 is coupled to a communication I/F 210 of a printer 200, and outputs and receives information, such as print data, to and from the printer 200. A colorimetric device I/F 119 is coupled to the colorimetric device 120, and acquires color measurement data, including a colorimetric value, from the colorimetric device I/F 119. The communication I/Fs 118, 119, and 210 may support a standard for a universal serial bus (USB), near field communication, or the like. The communications performed by the communication I/Fs 118, 119, and 210 may be wired communications, wireless communications, or may be network communications using a local area network (LAN), the Internet, or the like.

The colorimetric device 120 is capable of measuring a color of each color patch formed on a print substrate that is an example of a medium on which a color chart is formed, and outputting a colorimetric value. The patch is also referred to as a color chip. For example, the colorimetric value is a value indicating lightness L and chromaticity coordinates a, b in the CIE Lab color space. The host device 100 acquires color measurement data from the colorimetric device 120, and executes various types of processing.

A profile adjustment program PR0 illustrated in FIG. 1 causes the host device 100 to implement a coordinate receiving function FU1, a color display processing function FU2, an adjustment point adding function FU3, and a profile adjusting function FU4.

The CPU 111 of the host device 100 loads information, stored in the storage device 114, onto the RAM 113 as appropriate, and executes the program thus loaded to execute various types of processing. The CPU 111 executes the profile adjustment program PR0, loaded onto the RAM 113, to execute the processing corresponding to the functions FU1 to FU4. The profile adjustment program PR0 causes the host device 100, which is a computer, to function as a coordinate receiving unit U1, a color display processing unit U2, an adjustment point adding unit U3, and a profile adjusting unit U4. The host device 100 executing the profile adjustment program PR0 implements a coordinate receiving step ST1, a color display processing step ST2, an adjustment point adding step ST3, and a profile adjusting step ST4. A computer-readable medium storing the profile adjustment program PR0, for causing the computer to implement the functions FU1 to FU4, is not limited to a storage device inside the host device, and may be a recording medium outside the host device.

The host device 100 includes a computer such as a personal computer (including a tablet terminal) and the like. For example, a main body of a desktop personal computer may serve as the host device 100. In such a case, generally, the display device 130, the colorimetric device 120, and the printer 200 are coupled to the main body. A computer integrated with a display device such as a laptop personal computer may serve as the host device 100. In such a case, generally, the colorimetric device 120 and the printer 200 are coupled to the computer. Note that the host device integrated with the display device also outputs display data to the internal display device. The host device 100 may have all the components 111 to 119 accommodated in a single casing, or may be divided into a plurality of devices that can communicate with each other. The present technique can also be applicable, even in a case whereat least a part of the display device 130, the colorimetric device 120, and the printer 200 are included in the host device 100.

The printer 200 illustrated in FIG. 1 is an inkjet printer that forms an output image IM0 corresponding to print data, by discharging (ejecting) color materials, including cyan (C) ink, magenta (M) ink, yellow (Y) ink, and black (K) ink, from a recording head 220. The recording head 220 is supplied with the cyan, magenta, yellow, and black (CMYK) ink respectively from ink cartridges Cc, Cm, Cy, and Ck, and discharges CMYK ink droplets 280 respectively through nozzles Nc, Nm, Ny, and Nk. When the ink droplets 280 hit a print substrate ME1, ink dots are formed on the print substrate ME1. As a result, a printed matter having an output image IM0 is obtained on the print substrate ME1.

3. SPECIFIC EXAMPLE OF COLOR MANAGEMENT SYSTEM

Next, an example of a color management system to which the present technique can be applied is described with reference to FIG. 2. In an exemplary embodiment described below, a second color space CS2 (see FIG. 3) that depends on the inkjet printer 200 may be the CMYK color space. In such a case, the second color space CS2 is referred to as a cmyk color space to be distinguished from a CMYK color space that is a first color space CS1 (see FIG. 3) that depends on a target printer 300.

Figure 2:
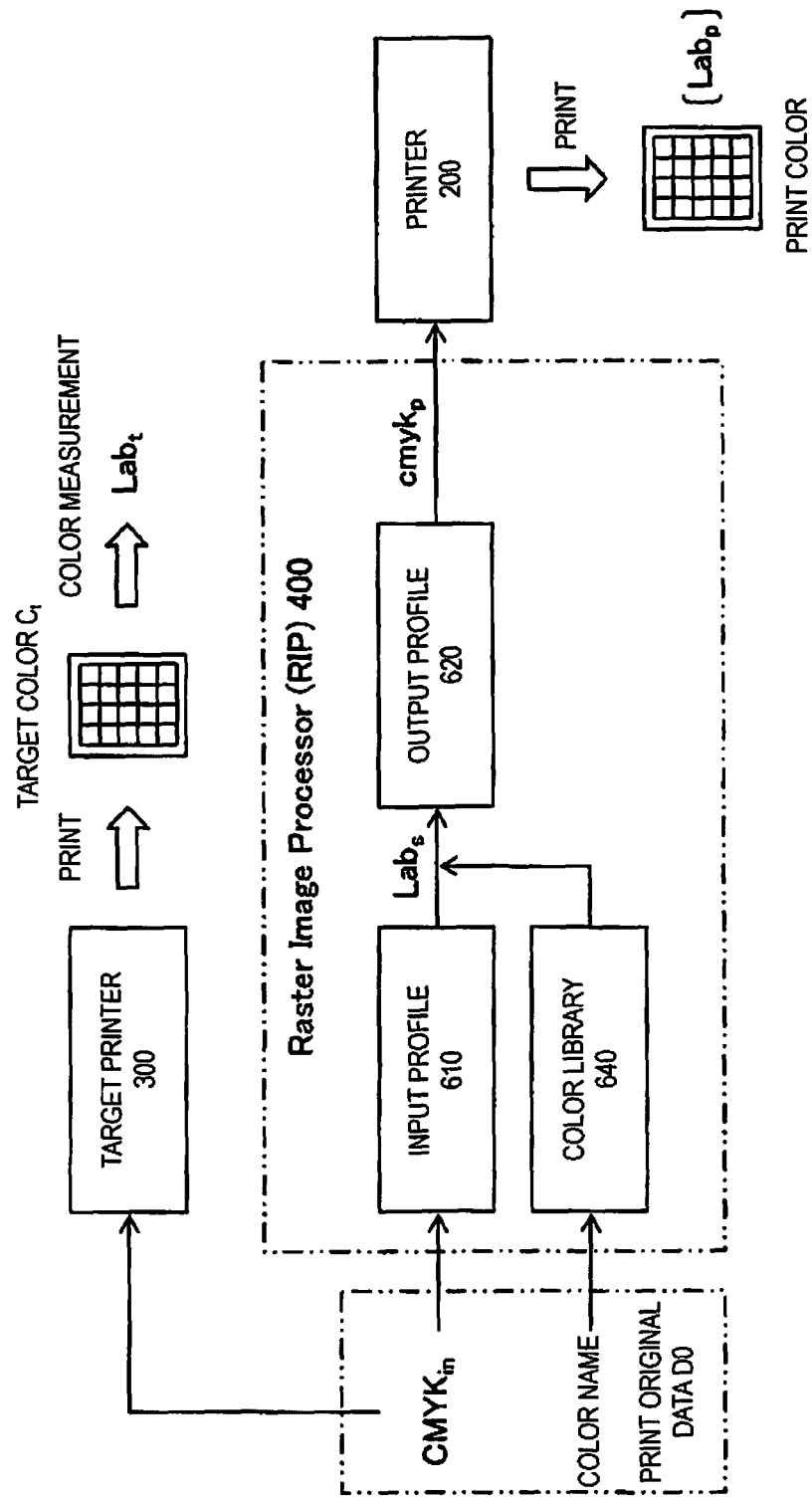
FIG. 2 is a schematic diagram illustrating an example flow of color management.

The color management system illustrated in FIG. 2 converts print original data D0 with a raster image processor (RIP) 400 into output data, representing a printed color cmyk$_p$ (cyan, magenta, yellow, black), and makes the inkjet printer 200 form a printed matter. The print original data D0 represents a process color CMYK$_{in}$ for reproducing a target color (target color C$_t$) with CMYK ink (color material) of the target printer 300, which is an example of a target device for color matching. A color name in a color library can also be designated in the print original data D0. For example, the color library may be Pantone (registered trademark) color library or the like.

The target printer 300 is assumed to be an offset printer, but may also be a gravure printer, a flexographic printer, or the like. For example, the target color C$_t$ is represented by a coordinate value (Lab value) in the CIE Lab color space. FIG. 2 illustrates how the target printer 300 prints a color chart representing the target color C$_t$ on the print substrate, and how the colorimetric device acquires a colorimetric value Lab$_t$ by measuring each patch of the color chart. The process color CMYK$_{in}$ corresponds to an amount of the CMYK ink used by the target printer 300, and represents coordinates in the CMYK color space that depends on the target printer 300.

The RIP 400 includes an input profile 610, an output profile 620, and a color library 640. The input profile 610 is a file describing color characteristics of the ink used by the target printer 300. The output profile 620 is a file describing color profile characteristics of the ink used by the inkjet printer 200. For example, a data format of an ICC profile can be used for both profiles 610 and 620. The process color CMYK$_{in}$ of the print original data D0 is converted into a color Lab$_s$ in a Lab color space according to the input profile 610, and is converted into a print color cmyk$_p$ according to the output profile 620. When the printer 200 uses ink with a total of four colors CMYK, the print color cmyk$_p$ is output to the printer 200 to be reproduced on a printed matter. FIG. 2 illustrates how the printer 200 prints a color chart, representing the print colors cmyk$_p$, on the print substrate. With a colorimetric device, such a colorimetric device is capable of acquiring a colorimetric value Lab$_p$ by measuring a color of each patch of the color chart. However, some users do not own the colorimetric device. When the printer 200 also uses ink such as light cyan (Lc), light magenta (Lm), dark yellow (Dy), and light black (Lk), the RIP 400 or the printer 200 classifies the print colors cmyk$_p$ into dark colors and light colors and thus the printer 200 is capable of reproducing the print colors cmyk$_p$ on the printed matter. The print color itself is not limited the total of four colors CMYK.

When a color name is set to the print original data D0, the RIP 400 may convert the color name into the color Lab$_s$ in the Lab color space by referring to the color library 640.

The RIP 400 further includes an input profile for converting between coordinate values in the Lab color space and not only the process colors CMYK$_{in}$ but also process colors (referred to as CMY$_{in}$) representing amounts of the color materials including three primary colors CMY of subtractive color mixing, process colors (referred to as RGB$_{in}$) representing intensities of three primary colors red (R), green (G), and blue (B) of additive color mixture, and the like. Thus, the RIP 400 can further convert the process color CMY$_{in}$ and the process color RGB$_{in}$ via a Lab color space, into the print colors cmyk$_p$. Furthermore, the RIP 400 is also capable of receiving the color Lab$_s$ in the Lab color space and converting the color Labs into the print colors cmyk$_p$.

With the configuration described above, the inkjet printer 200 reproduces a color close to the color of the target printer 300. However, in actual cases, the expected color may not be reproducible due to a profile error, a color measurement error, a printer variation, or the like. In such a case, the profiles 610 and 620 are corrected to achieve higher conversion accuracy of a color to be adjusted.

Figure 3:
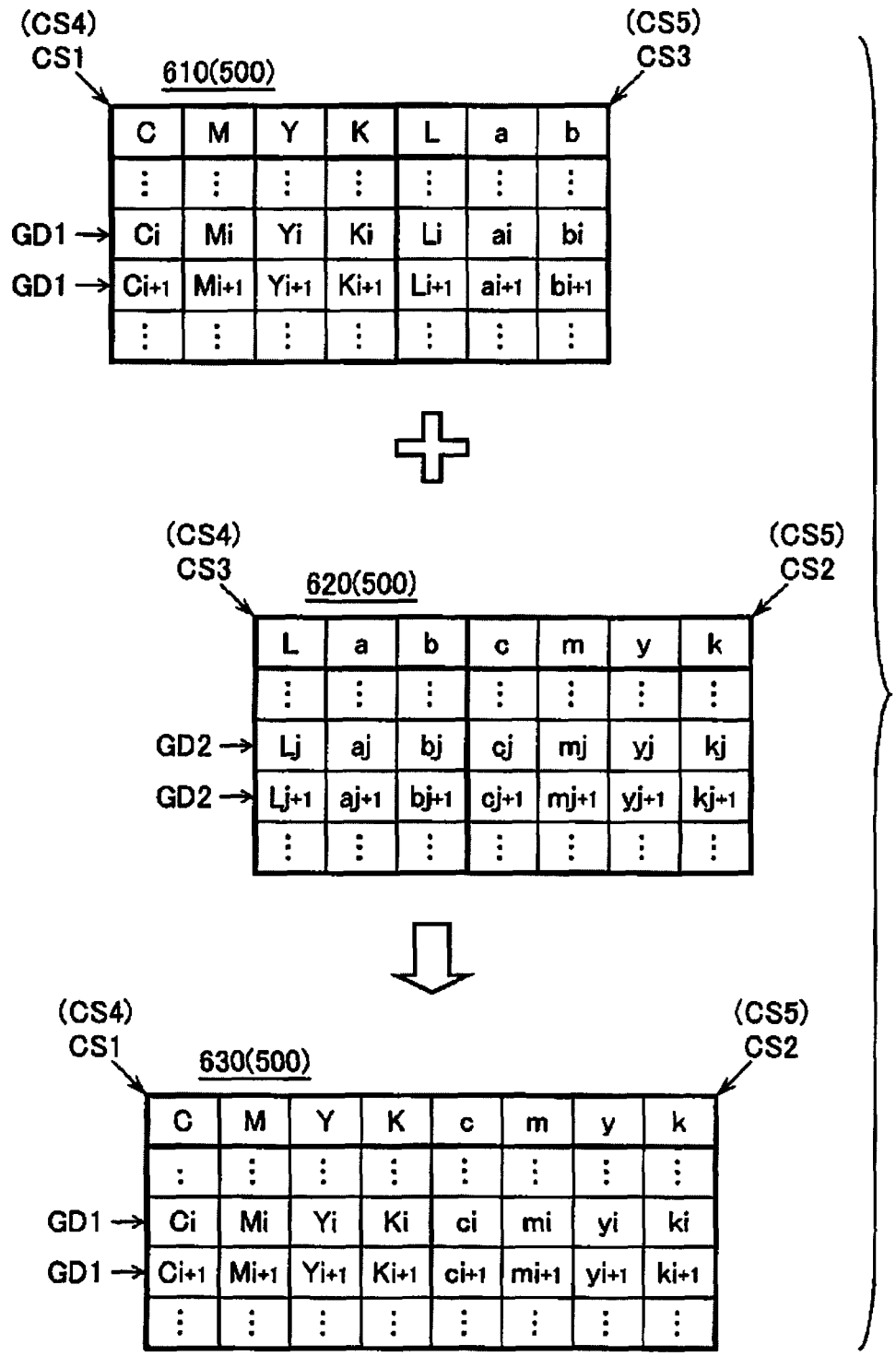
FIG. 3 is a schematic diagram illustrating example relationship between various profiles.

As an example illustrated in FIG. 3, a profile 500 is data defining correspondence relationships between coordinate values in an input color space CS4 and coordinate values in an output color space CS5. The input profile 610 is data defining correspondence relationships between CMYK values ($C_i$, $M_i$, $Y_i$, $K_i$) of the CMYK color space (an example of a first color space CS1) corresponding to ink used by the target printer 300 and Lab values ($L_i$, $a_i$, $b_i$) of the Lab color space (an example of a profile connection space (PCS) CS3). In this case, grid points GD1 of an A2B table are generally arranged at a substantially equal interval in a C axis direction, an M axis direction, a Y axis direction, and a K axis direction, in the CMYK color space. A variable i as used herein serves as a variable for identifying the grid point GD1 set in the CMYK color space (CS1).

The output profile 620 is data defining correspondence relationships between Lab values ($L_i$, $a_i$, $b_i$) in the Lab color space (CS3) and cmyk values ($c_i$, $m_i$, $y_i$, $k_i$) in the cmyk color space (an example of a second color space CS2) corresponding to the ink used by the inkjet printer 200. In this case, grid points GD2 of a B2A table are generally arranged at a substantially equal interval in an L axis direction, an a-axis direction, and a b-axis direction, in the Lab color space. A variable i as used herein serves as a variable for identifying the grid point GD2 set in the Lab color space (CS3). The term "cmyk color space" is used to distinguish the color space corresponding to the ink used by the printer 200 from the color space corresponding to the target printer 300.

The device link profile 630 is data defining correspondence relationships between CMYK values ($C_i$, $M_i$, $Y_i$, $K_i$) in the CMYK color space (CS1) and cmyk values ($c_i$, $m_i$, $y_i$, $k_i$), in the cmyk color space (CS2). A variable i as used herein serves as a variable for identifying the grid point GD1 set in the CMYK color space (CS1). The device link profile 630 is obtained by combining the input profile 610 and the output profile 620.

The grid point denotes a virtual point in the input color space. An output coordinate value corresponding to a position of a grid point in the input color space is assumed to be stored in the grid point. The present technique includes a configuration where a plurality of grid points are evenly arranged in the input color space, and also includes a configuration where a plurality of grid points are unevenly arranged in the input color space.

4. SPECIFIC EXAMPLE OF PROCESS EXECUTED BY PROFILE ADJUSTMENT DEVICE

Figure 4:
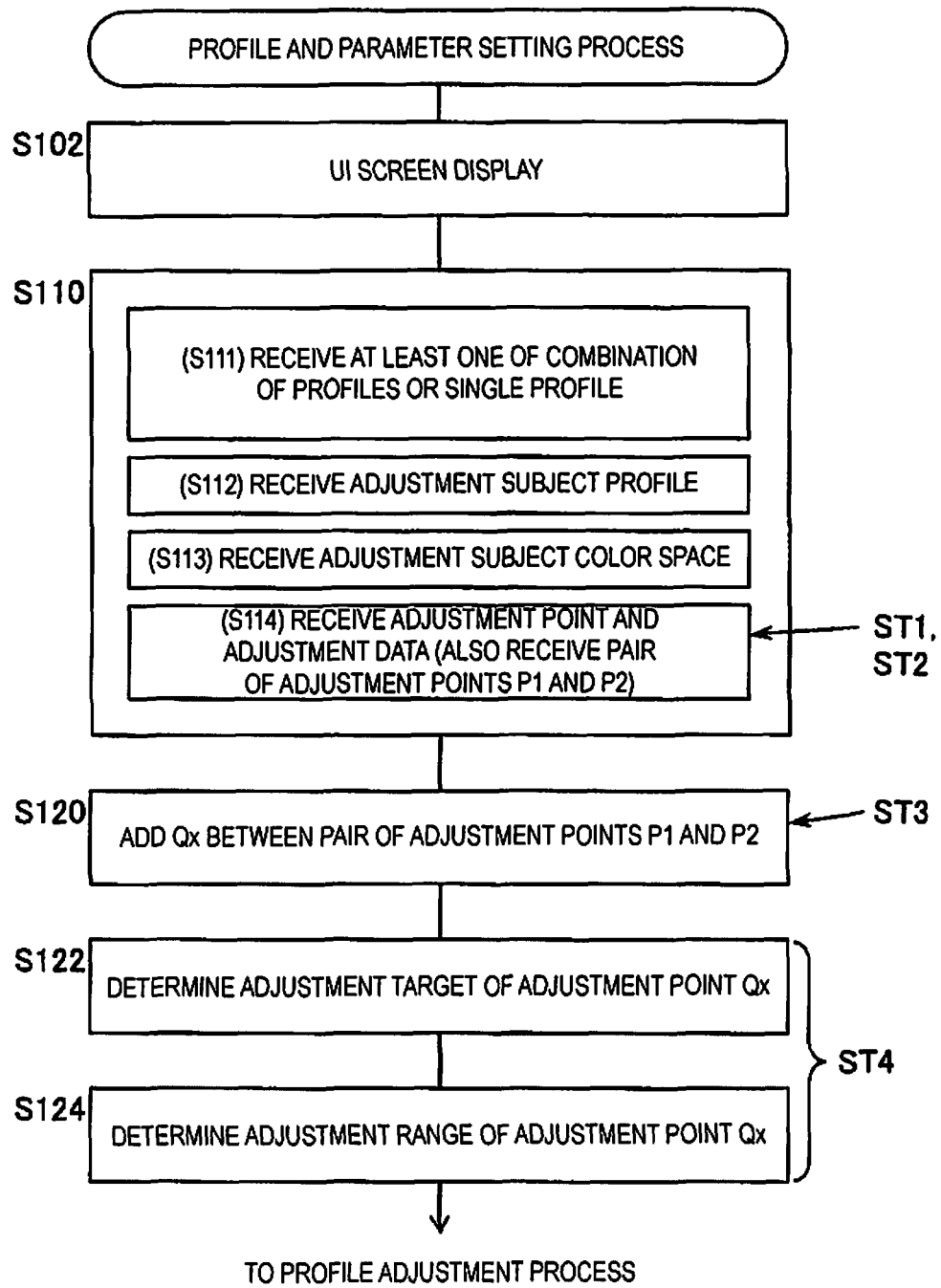
FIG. 4 is a flowchart illustrating an example profile and parameter setting process.
Figure 6:
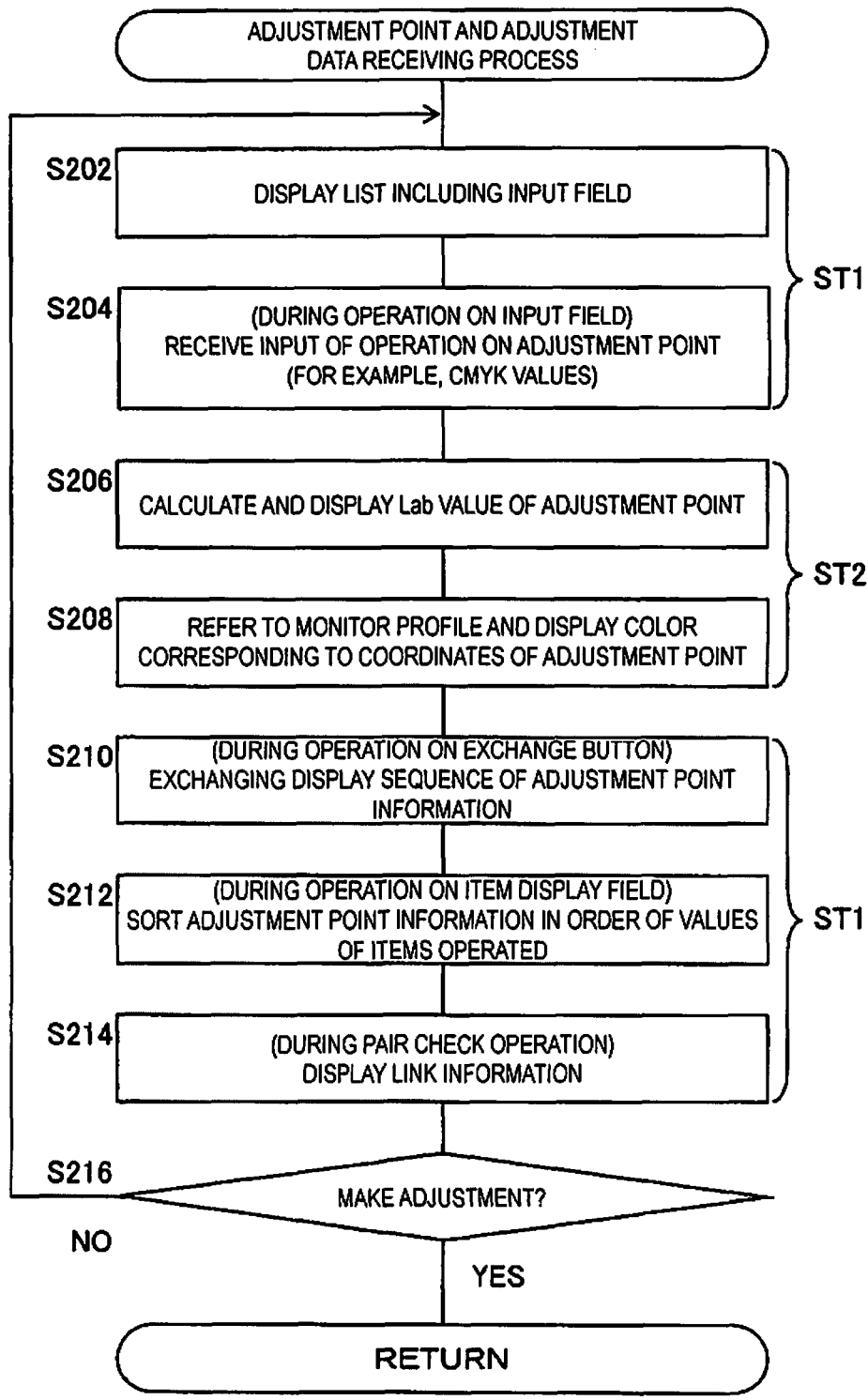
FIG. 6 is a flowchart illustrating an example adjustment point and adjustment data receiving process.

FIG. 4 illustrates an example of a profile and a parameter setting process executed by the host device 100 illustrated in FIG. 1. FIG. 5 illustrates an example of a user interface (UI) screen 800 displayed in step S102. FIG. 6 illustrates an example of an adjustment point and an adjustment data receiving process executed in step S114 in FIG. 4. FIG. 7 illustrates an example of a profile adjustment process executed by the host device 100. These processes can be changed as appropriate by changing a sequence or the like. The host device 100 executes a plurality of processes in parallel in a multitasking manner. Steps S202 to S204 and S210 to S214 in FIG. 6 and step S322 in FIG. 7 correspond to the coordinate receiving unit U1, the coordinate receiving step ST1, and the coordinate receiving function FU1. Steps S206 to S208 in FIG. 6 correspond to the color display processing unit U2, the color display processing step ST2, and the color display processing function FU2. Step S120 in FIG. 4 corresponds to the adjustment point adding unit U3, the adjustment point adding step ST3, and the adjustment point adding function FU3. Steps S122 to S124 in FIG. 4 and steps step S304 to S320 in FIG. 7 correspond to the profile adjusting unit U4, the profile adjusting step ST4, and the profile adjusting function FU4. In the description below, the word "step" is omitted.

When the profile and parameter setting process illustrated in FIG. 4 starts, the host device 100 outputs display data DD0 to be displayed on the UI screen 800 illustrated in FIG. 5 to the display device 130, and causes the display device 130 to display the UI screen 800 (S102). This process is hereinafter simply referred to as displaying a screen or the like. The UI screen 800 includes an input profile selection field 811, an output profile selection field 812, a device link profile selection field 813, an adjustment subject profile designation field 820, an adjustment subject color space selection field 830, an edit screen display button 840, an adjustment data selection field 845, an adjustment execution button 870, and the like. For example, upon receiving an operation on the edit screen display button 840 through the input device 115, the host device 100 adds a list 700, a "designate from image" button 841, an add button 842, and a delete button 843 to the UI screen 800.

The host device 100 receives an operation on a field or a button through the input device 115 (S110), and the process proceeds to S120 when an operation on the adjustment execution button 870 is received. The process in S110 includes the following processes S111 to S114.

(S111) A process of receiving selection of any one of a combination of profiles used for converting CMYK values into cmyk values, or a single profile serving as an adjustment subject profile 550 to be used for converting CMYK values into cmyk values.

(S112) A process of receiving any one of the profiles 610, 620, and 630, as the adjustment subject profile 550.

(S113) A process of receiving any one of two or more types of color spaces including the CMYK color space (CS1), the cmyk color space (CS2), and the Lab color space (CS3), as the adjustment subject color space CS6.

(S114) A process of receiving an input of an adjustment point P0 indicating the color to be adjusted and adjustment data (adjustment target T0 and adjustment range A0) indicating an adjustment degree at the adjustment point P0. This process includes a process of receiving a pair of adjustment points P1 and P2 linked to each other, as examples illustrated in FIGS. 11A and 11b.

First, the process in S111 is described with reference to FIGS. 5 and 12A to 12E. Elements surrounded by bold lines in FIG. 12A to 12E each represent the adjustment subject target profile 550. In the device link profile 630 illustrated in FIG. 12C, a device link table is to be adjusted, and "original A2B" and "original B2A" respectively represent an original input profile and an original output profile.

Upon receiving an operation on the selection fields 811 to 813 through the input device 115, the host device 100 receives an operation of selecting a profile in the profiles 500 stored in the storage device 114.

In the input profile selection field 811, when the input profile 610 is used for color conversion, an input profile used for the color conversion can be selected from the input profiles 610 stored in the storage device 114. When the input profile 610 is not used for the color conversion, the input profile section field 811 may remain as an empty field.

In the output profile selection field 812, when the output profile 620 is used for color conversion, an output profile used for the color conversion can be selected from the output profiles 620 stored in the storage device 114. When the output profile 620 is not used for the color conversion, the output profile section field 812 may remain as an empty field.

In the device link profile selection field 813, when the device link profile 630 is used for color conversion, a device link profile used for the color conversion can be selected from the device link profiles 630 stored in the storage device 114. When the device link profile 630 is not used for the color conversion, the device link profile section field 813 may remain as an empty field.

Figure 12A:
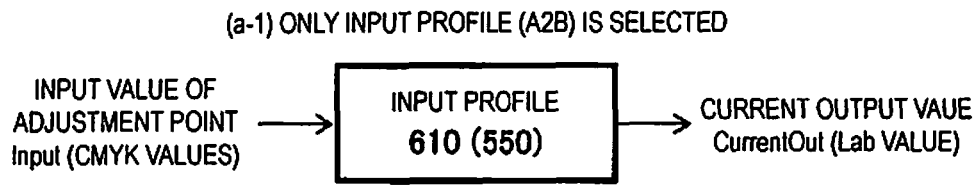
FIGS. 12A to 12E are schematic diagrams illustrating an example where a current output value is calculated.

When the input profile 610 is selected only in the input profile selection field 811, the input profile 610 is used for the color conversion as illustrated in FIG. 12A. Thus, the input profile 610 automatically serves as the adjustment subject profile 550.

Figure 12B:
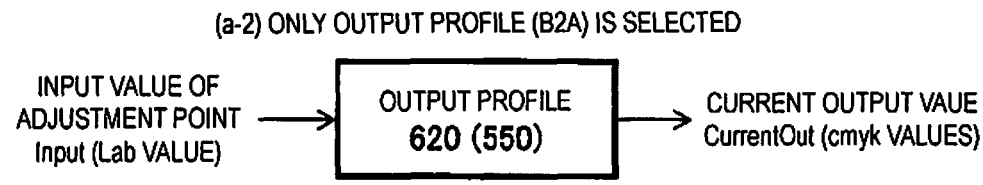

When the output profile 620 is selected only in the output profile selection field 812, the output profile 620 is used for the color conversion as illustrated in FIG. 12B. Thus, the output profile 620 automatically serves as the adjustment subject profile 550.

Figure 12C:
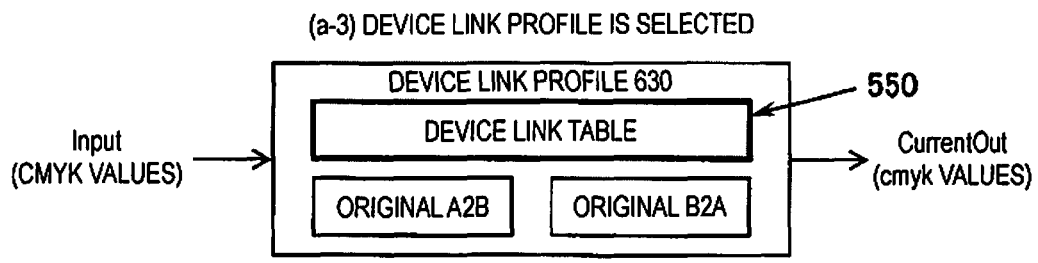

When the device link profile 630 is selected only in the device link profile selection field 813, the device link profile 630 is used for the color conversion as illustrated in FIG. 12C. Thus, the device link profile 630 automatically serves as the adjustment subject profile 550.

Figure 12D:
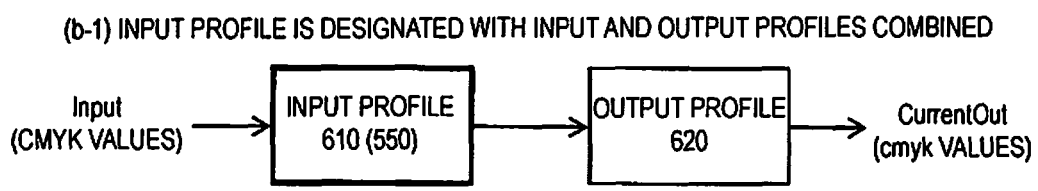

When the input profile 610 is selected in the input profile selection field 811 and the output profile 620 is selected in the output profile selection field 812, a combination of the input profile 610 and the output profile 620 is used for the color conversion as illustrated in FIGS. 12D and 14E.

Next, the process in S112 is described with reference to FIG. 5.

The host device 100 is performing a process of changing a selection item in the adjustment subject profile designation field 820 according to the selection in the selection fields 811 to 813 described above.

When the input profile 610 is selected only in the input profile selection field 811, only the input profile 610 can be selected as an adjustment subject in the adjustment subject profile designation field 820.

When the output profile 620 is selected only in the output profile selection field 812, only the output profile 620 can be selected as an adjustment subject in the adjustment subject profile designation field 820.

When the device link profile 630 is selected only in the device link profile selection field 813, only the output profile 630 can be selected as an adjustment subject in the adjustment subject profile designation field 820.

When the input profile 610 is selected in the input profile selection field 811 and the output profile 620 is selected in the output profile selection field 812, any one of the designated items including the input profile 610, the output profile 620, and the device link profile 630 can be selected. FIG. 5 illustrates an example where the output profile 620 is selected in the adjustment subject profile designation field 820. This case corresponds to "(b-2) output profile is designated with input and output profiles combined" illustrated in FIG. 12E.

Now, the process in S113 is described with reference to FIG. 5 and the like.

The host device 100 is performing a process of changing a selected item in the adjustment subject color space selection field 830 according to the selection in the selection fields 811 to 813 described above.

When the input profile 610 is selected in the input profile selection field 811, any one of selected items including "input data" and "PCS value" can be designated in the adjustment subject color space selection field 830. The "input data" is an item for selecting the CMYK color space (an example of the first color space CS1 and the input color space CS4) as the adjustment subject color space CS6 (see FIG. 14A). The "PCS value" is an item for selecting the Lab color space (an example of a third color space CS3 and an output color space CS5) as the adjustment subject color space CS6 (see FIG. 14B).

When the output profile 620 is selected only in the output profile selection field 812, one of selected items "PCS value" and "output data" can be designated in the adjustment subject color space selection field 830. The "PCS value" is an item for selecting the Lab color space (an example of a third color space CS3 and an input color space CS) as the adjustment subject color space CS6 (see FIG. 14C). The "output data" is an item for selecting the cmyk color space (an example of the second color space CS2 and the output color space CS5) as the adjustment subject color space CS6 (see FIG. 14D).

When the input profile 610 is selected in the input profile selection field 811 and additionally the output profile 620 is selected in the output profile selection field 812, anyone of the selected items including "input data", "output data", and "PCS value" can be designated, in the adjustment subject color space selection field 830. The "input data" is an item for selecting the CMYK color space (an example of the first color space CS1 and the input color space CS4 in the input profile 610) as the adjustment subject color space CS6 (see FIG. 15A). The "output data" is an item for selecting the cmyk color space (an example of the second color space CS2 and the output color space CS5 in the output profile 620) as the adjustment subject color space CS6 (see FIG. 15B). The "PCS value" is an item for selecting the Lab color space (an example of the third color space CS3, an input color space CS5 in the input profile 610, and an input color space CS4 in the output profile 620) as the adjustment subject color space CS6 (see FIG. 15C).

Also when the device link profile 630 is selected in the device link profile selection field 813, any one of the "input data", the "output data", and the "PCS value" can be designated in the adjustment subject color space selection field 830.

The process in S114 is further described with reference to FIGS. 5 and 6 and the like.

Figure 8:
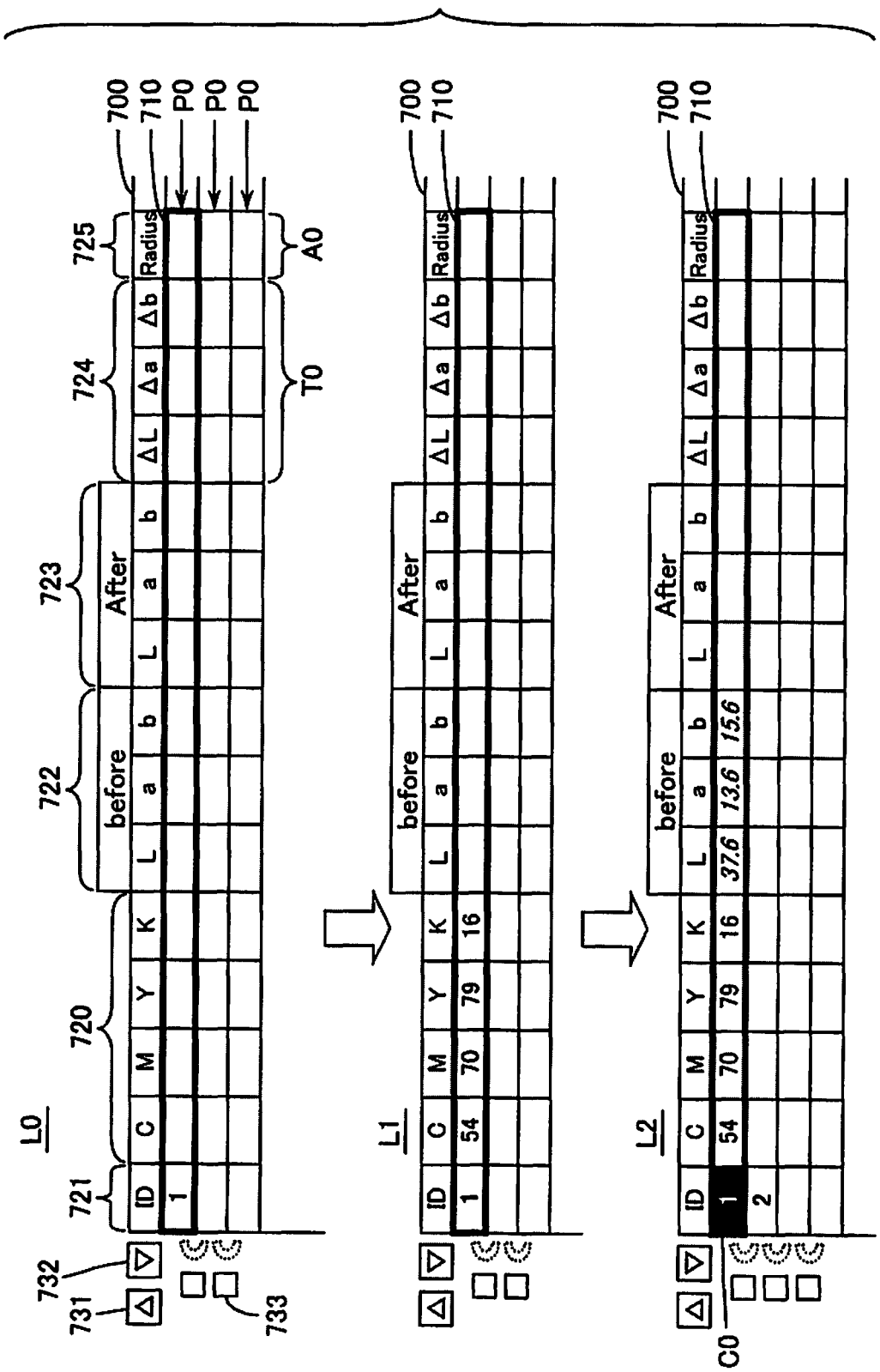
FIG. 8 is a schematic diagram illustrating an example change in a list.

For example, when the edit screen display button 840 illustrated in FIG. 5 is operated, the host device 100 starts a receiving process of an adjustment point and adjustment data illustrated in FIG. 6. First, the host device 100 causes the display device 130 to display the list 700 according to the selection on the fields 811 to 813 and 830 described above (S202). For example, the list 700 as illustrated in FIG. 8 is displayed, when the input profile 610 and the output profile 620 are combined for the color conversion and the output profile 620 is adjusted in the Lab color space. The list 700 illustrated in FIG. 8 is a group of adjustment point information 710 including the input field 720 for the coordinates of the adjustment point P0. The list 700 includes the input field 720, and additionally includes at least an identification information (ID) display field 721, a before adjustment coordinate display field 722, an after adjustment coordinate display field 723, a target input field 724, and an adjustment range input field 725. The list 700 also displays exchange buttons 731 and 732, a check box 733, link information 734 (see FIG. 5), and the like. The host device 100 causes the ID display field 721 to display identification information (for example, a serial number) of the adjustment point P0, receives an input of the adjustment target T0 in the target input field 724, and receives an input of the adjustment range A0 (for example, a radius (Radius) from the adjustment point P0 serving as the base point) in the adjustment range input field 725. When "absolute value" is selected in the adjustment data selection field 845 illustrated in FIG. 5, an input of the absolute value (a Lab value, for example) of the adjustment target T0 is received in the target input field 724. When "relative value" is selected in the adjustment data selection field 845, an input of a relative value (ΔL, Δa, or Δb, for example) of the coordinate value of the adjustment target T0 is received in the target input field 724.

When the input field 720 is operated, the host device 100 receives an input of coordinates (CMYK values) in the CMYK color space (CS1) of the adjustment point P0, in the input field 720 (S204). The input field 720 after the input serves as a display field for the coordinates of the adjustment point P0. For example, when the CMYK values are input to the input fields 720 corresponding to an adjustment point ID=1 in the list L0, a state of the list L1 illustrated in FIG. 8 is achieved.

After the process in S204, the host device 100 calculates the Lab values (i.e., an example of a chroma value) corresponding to the CMYK values input to the input field 720, and displays the Lab values on the before adjustment coordinate display field 722 (S206). When the input profile 610 and the output profile 620 are used for the color conversion, CMYK values are converted into cmyk values according to the A2B table of the input profile 610 and the B2A table of the output profile 620. The cmyk values may be converted into Lab values according to the A2B table of the output profile 620, and the Lab values may be displayed on the coordinate display field 722 (see a list L2 in FIG. 8). To put it more simply, the CMYK values may be converted into the Lab values according to the A2B table of the input profile 610 to be displayed on the coordinate display field 722.

After the Lab values are displayed, the host device 100 refers to the monitor profile 450 to convert the Lab values into the CMYK values, generates display data DD0 for a color C0 corresponding to the CMYK values of the input field 720 on the background of the ID display field 721, and outputs the display data DD0 to the display device 130 (S208). Then, the color C0 corresponding to the CMYK values of the adjustment point P0 is displayed on the background of the ID display field 721, as the list L2 illustrated in FIG. 8.

The process illustrated in FIG. 6 is repeated until the adjustment execution button 870 illustrated in FIG. 5 is operated (S216). The processes in S204 to S208 are repeated, and inputting of the CMYK values of the adjustment point P0 and displaying of the Lab values and the color C0 corresponding to the CMYK values are repeated, as an example illustrated in FIG. 9. For example, when the CMYK values are input to the input field 720 where an adjustment point ID=2 as a list L3, the Lab values corresponding to the CMYK values corresponding to ID=2 is displayed on the coordinate display field 722, and the color C0 corresponding to the CMYK values corresponding to ID=2 is displayed on the background of the ID display field 721. A list L5 represents a state where the CMYK values have been input to the input field 720 corresponding to IDs are 1 to 6, and the Lab values and the color C0, corresponding to the CMYK values are displayed.

With the configuration described above, the relationship between the coordinates of the adjustment point P0 and the color to be adjusted can be quickly recognized. Thus, color information can be recognized from both objective and subjective amounts, and thus a profile adjustment operation can be easily performed.

When the user operates the exchange button 731 or 732 during the repeated process, the host device 100 receives such an operation and changes the display sequence of the adjustment point information 710 according to the received operation (S210). For example, upon receiving an operation on any of the fields in the ID display field 721, the host device 100 performs a process of changing the display sequence of the adjustment point information 710 corresponding to the ID of the field on which the operation has been received, according to the operation on the exchange button 731 or 732. The list L5 illustrated in FIG. 9 represents a state where the field corresponding to ID=5 in the ID display field 721 has been operated, and thus the color of the background of the adjustment point information 710 corresponding to ID=5 has changed to a color (for example, gray) in the selected state. When the upward exchange button 731 is operated in this state, the host device 100 receives such an operation, and performs an operation of exchanging the display sequence between the adjustment point information 710 in the selected state (ID=5, for example) and the immediately above adjustment point information (ID=4, for example). A list L6 represents a state where the upward exchange button 731 has been operated twice in the state of the list L5. When the downward exchange button 732 is operated, the host device 100 receives such an operation, and performs a process of exchanging the display sequence between the adjustment point information 710 in the selected state (ID=3, for example) and the immediately below adjustment point information (ID=4, for example).

When the user operates any of the fields (such as a C value field, an M value field, a Y value field, a K value field, an L value field, an a value field, and a b value field, for example) during the repeated process, the host device 100 receives the operation and sorts (rearranges) pieces of the adjustment point information 710 so that the values corresponding to the field on which the operation has been received are arranged in a descending or an ascending order (S212). For example, when an operation on the L value field in the item display field 705 is received, the host device 100 first sorts the pieces of the adjustment point information 710 so that the L values are arranged in the ascending order. A list L7 illustrated in FIG. 10 represents a state where the L value field in the list L6 illustrated in FIG. 9 has been operated and thus the adjustment point information 710 has been rearranged so that the L values are arranged in the ascending order. When an operation on the L value field is received again, the host device 100 this time sorts the adjustment point information 710 so that the L values are arranged in the descending order. A list L8 represents a state where the L value field in the list L7 has been operated and thus the adjustment point information 710 has been rearranged so that the L values are arranged in the descending order. The host device 100 performs the process with the sequence of the L values switched from one of the ascending order and the descending order to the other, each time an operation on the L value field is received. When an operation on any other field in an item display field 705 is also received, the host device 100 performs the process of switching the sequence of the values corresponding to the field on which the operation has been received, between the ascending order and the descending order.

Through the processes in S210 and S212, the operation of changing the display sequence of the adjustment point information 710 in the list 700 is received. Then, the list 700 with the display sequence of the adjustment point information 710 changed according to the operation is displayed on the display device 130. Thus, the profile adjustment operation can be easily performed.

When the user operates the check box 733 during the repeated process, the host device 100 receives such an operation and displays link information 734 indicating that a pair of adjustment points P1 and P2, for the received portion, are linked (S214). The operation on the check box 733 is an example of an operation of linking the first adjustment point P1 at the first coordinates and the second adjustment point P2 at the second coordinates, in a plurality of the adjustment points P0 displayed in the list 700. For example, the list L9 represents a state where the check box 733 for linking the adjustment points with the ID=3 and ID=4 has been operated, and thus the first adjustment point P1 with the CMYK values (0, 60, 93, 0) serving as the first coordinates and the second adjustment point P2 with the CMYK values (49, 45, 5, 0) serving as the second coordinates have been linked.

The processes in S202 to S214 are repeated until the adjustment execution button 870 illustrated in FIG. 5 is operated (S216). When the adjustment execution button 870 is operated, the process in S110 illustrated in FIG. 4 is completed. Then, the host device 100 performs a process of adding a third adjustment point Qx between the pair of adjustment points P1 and P2 (S120) The variable x as used herein serves as a variable for identifying the third adjustment point Q. In the process in S120, the third adjustment point Qx at the third coordinates is set between the first coordinates of the first adjustment point P1 and the second coordinates of the second adjustment point P2. For example, the coordinates indicating the positions of the adjustment points P1, P2, and Qx are represented by coordinate values in the input color space C24 of the adjustment subject profile 550. When the input profile 610 is the adjustment subject profile 550, the coordinates of the adjustment points P1, P2, and Qx are represented by CMYK values. When the output profile 620 is the adjustment subject profile 550, the coordinates of the adjustment points P1, P2, and Qx are represented by the Lab value. When the device link profile 630 is the adjustment subject profile 550, the coordinates of the adjustment points P1, P2, and Qx are represented by CMYK values.

Figure 11A:
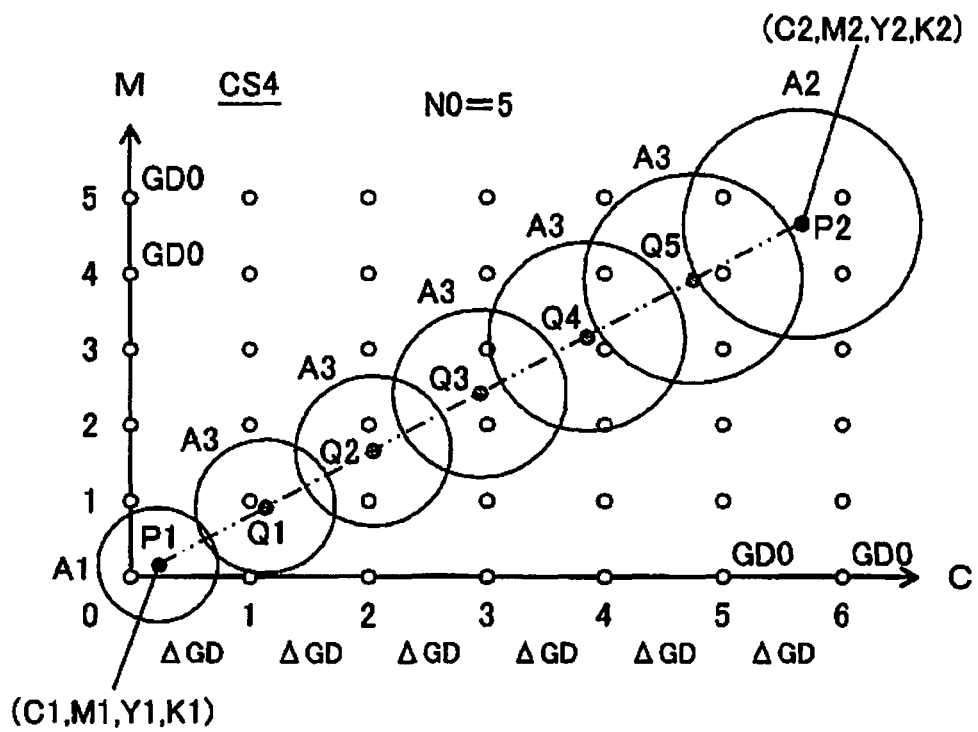
FIG. 11A is a schematic diagram illustrating an example where a third adjustment point is added between a first adjustment point and a second adjustment point and an adjustment range with the third adjustment point serving as the base point is determined.

FIG. 11A schematically illustrates an example where the third adjustment point Qx is added between the adjustment points P1 and P2 and the third adjustment range A3 with the third adjustment point Qx serving as the base point is determined, in a case where the input color space CS4 is the CMYK color space. The CMYK color space has coordinate axes including a C axis, an M axis, a Y axis, and, a K axis. FIG. 11A illustrates an input color space CS4 of the adjustment subject profile 550 on a plane passing through the C axis and the M axis, for the sake of illustration. In the figure, a white circle represents the grid point GD0 of the adjustment subject profile 550, black circles represent the adjustment points P1 and P2, and a hatched circle represents the third adjustment point Qx. The C axis and Y axis in FIG. 11A represent coordinate values with a distance $\Delta GD$ between the grid points GD0 set as a unit.

The added third adjustment point Qx is generated on a line between the adjustment points P1 and P2 in the input color space CS4 of the adjustment subject profile 550.

For example, it is assumed that the input color space CS4 is the CMYK color space, the coordinates of the first adjustment point P1 are (C1, M1, Y1, K1) with the distance $\Delta GD$ between the grid points GD0 set as a unit, and the coordinates of the second adjustment point P2 are (C2, M2, Y2, K2) with the distance $\Delta GD$ between the grid points GD0 set as a unit. In such a configuration, the position of the third adjustment point Qx can be set as follows, for example.

First, a coordinate axis with the longest distance between the adjustment point P1 and the second adjustment point P2 with the distance $\Delta GD$ between the grid points GD0 set as a unit is selected from the C axis, M axis, Y axis, and K axis of the CMYK color space. This selection can be made by selecting a coordinate axis corresponding to the largest value of |C2−C1|, |M2−M1|, |Y2−Y1|, and |K2−K1|. FIG. 11A illustrates an example where the C axis is selected because 5<|C2−C1|<6 and 4<|M2−M1|<5 hold true and |C2−C1| is larger than |M2−M1|, |Y2−Y1|, and |K2−K1|.

Next, the third adjustment points Qx are set to be the number N0 achieving a distance shorter than or equal to the distance $\Delta GD$ between the grid points GD0. FIG. 11A illustrates an example where the number N0 of the third adjustment points Qx is set to be small as much as possible. For example, when the C axis is selected and N1<|C2−C1|≤N1+1 (where N1 is a positive integer) holds true, and N0 is set to be N1, at least one third adjustment point Qx is provided between the grid points of the adjustment subject profile 550, with the distance between the third adjustment points Qx being shorter than or equal to the distance $\Delta GD$ between the grid points GD0. In the example illustrated in FIG. 11A, 5<|C2−C1|<6 holds true and thus N0 is 5. The number N0 of the third adjustment points Qx may be increased to further improve the gradation of the output image despite an increase in the process time.

The third adjustment point Qx can be similarly added also in a case where the input color space CS4 is the Lab color space.

After the third adjustment point Q is added, the host device 100 determines the third target T3 at the third adjustment point Qx based on the first target T1 at the first adjustment point P1 and the second target T2 at the second adjustment point P2 (S122).

Figure 11B:
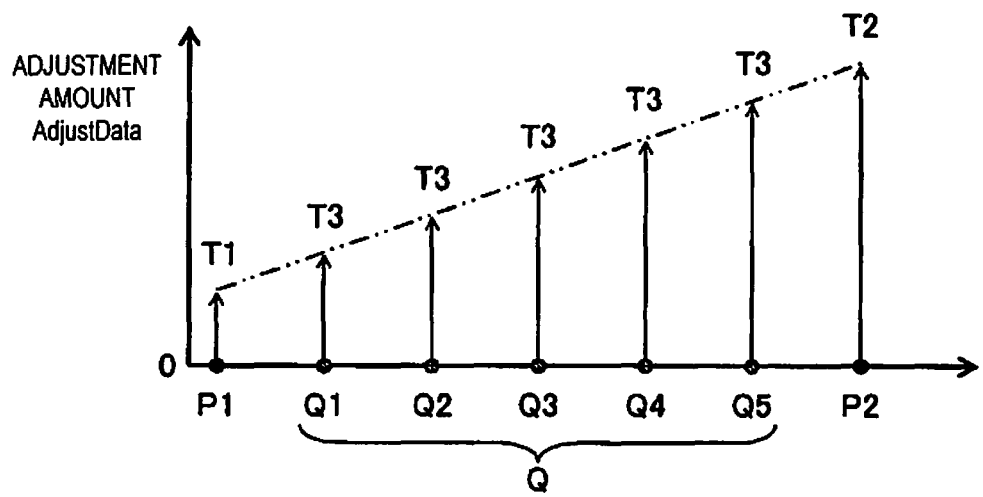
FIG. 11B is a schematic diagram illustrating an example where an adjustment target is determined in the third adjustment point.

FIG. 11B schematically illustrates how the third adjustment target T3 at the third adjustment point Qx is determined by interpolation. In FIG. 11B, the horizontal axis represents the positions of the adjustment points P1, Qx, and P2, and the vertical axis represents an adjustment amount AdjustData. The adjustment amount AdjustData is represented by a relative value, and is represented by CMYK values ($\Delta Cp$, $\Delta Mp$, $\Delta Yp$, $\Delta Kp$), Lab values ($\Delta Lp$, $\Delta ap$, $\Delta bp$), or cmyk values ($\Delta cp$, $\Delta mp$, $\Delta yp$, $\Delta kp$).

For example, it is assumed that the adjustment amount AdjustData are CMYK values, an adjustment amount AdjustData of the first adjustment point P1 (an example of the first target T1), and an adjustment amount AdjustData of the second adjustment point P2 (an example of the second target T2). When the adjustment amount AdjustData of the third adjustment point Qx (an example of the third target T3) is represented by ($\Delta C3x$, $\Delta M3x$, $\Delta Y3x$, $\Delta K3x$), the adjustment amount AdjustData of the third adjustment point Qx can be calculated through the following interpolation formulae.

$$\Delta C3x = \Delta C1 + x \cdot (\Delta C2 - \Delta C1)/(N0+1)$$

$$\Delta M3x = \Delta M1 + x \cdot (\Delta M2 - \Delta M1)/(N0+1)$$

$$\Delta Y3x = \Delta Y1 + x \cdot (\Delta Y2 \Delta Y1)/(N0+1)$$

$$\Delta K3x = \Delta K1 + x \cdot (\Delta K2 - \Delta K1)/(N0+1)$$

The adjustment amount AdjustData of the third adjustment point Qx can be similarly calculated also in a case where the adjustment amount AdjustData can be Lab values or cmyk values. The adjustment amount AdjustData of the third adjustment point Qx is not limited to interpolation values of the adjustment amounts AdjustData of the adjustment points P1 and P2, and may be a value shifted from the interpolation value.

The host device 100 determines the third adjustment range A3 having the third adjustment point Qx serving as the base point, based on the first adjustment range A1 having the first adjustment point P1 serving as the base point and the second adjustment range A2 having the second adjustment point P2 serving as the base point (S124), and ends the profile and parameter setting process. The process in S124 may be performed before the process in S122.

FIG. 11A also illustrates how the third adjustment range A3 having the third adjustment point Qx serving as the base point is determined by interpolation. For example, it is assumed that Radius_1 represents the first adjustment range A1 having the first adjustment point P1 serving as the base point and Radius_2 represents the second adjustment range A2 having the second adjustment point P2 serving as the base point. Under these conditions, the third adjustment range A3 can be obtained through the following interpolation formula, where Radius_3x represents the third adjustment range A3 having the third adjustment point Qx serving as the base point.

Radius_3x=Radius_1+x·(Radius_2−Radius_1)/(N0+1)

The third adjustment range A3 having the third adjustment point Qx serving as the base point is not limited to the interpolation values of the adjustment ranges A1 and A2 respectively having the adjustment points P1 and P2 serving as the base points, and may be a value shifted from the interpolation value.

When the profile and parameter setting process illustrated in FIG. 4 is terminated, the host device 100 performs a profile adjustment process illustrated in FIG. 7. First of all, the host device 100 obtains a current output value CurrentOut according to the profile (including a combination of profiles) for color conversion designated in the profile selection fields 811 to 813, for the adjustment points P0 input to the list 700 and the added third adjustment point Qx (S304). This is for performing the adjustment with the output color cmykp, corresponding to the color of the output image IM0 formed on the print substrate ME1, serving as a reference.

In the description below, a simple description "adjustment point P0" is assumed to include a third adjustment point Qx.

For example, in a case (a-1) where the input profile 610 is designated for the color conversion as illustrated in FIG. 12A, an input value Input at each adjustment point P0 can be CMYK values (referred to as Cp, Mp, Yp, Kp). In such a case, the current output value CurrentOut includes Lab values (referred to as Lp, ap, bp). Here, the variable p is for identifying the adjustment point P0.

Here, conversion according to the profile is represented by $f_{icc}$ (first argument, second argument, third argument). The first argument represents a used profile. In the first argument, InputProfile represents the input profile, OutputProfile represents an output profile, and DLProfile represents a device link profile. In the second argument, A2B represents conversion from a device color to a device independent color. B2A represents conversion from a device independent color to a device color. A2B0 represents conversion by the device link table. Input in the third argument represents an input value (such as CMYK, RGB, or Lab) at the adjustment point P0.

In the case (a-1) described above, the adjustment subject profile 550 is automatically set to be the input profile 610, and the current output value CurrentOut can be calculated with the following formula (see FIG. 13).

CurrentOut=$f_{icc}$(InputProfile, A2B, Input)

In a case (a-2) illustrated in FIG. 12B where the output profile 620 is selected for the color conversion, the input value Input at each adjustment point P0 can be Lab values (referred to as Lp, ap, bp). In this case, the current output value CurrentOut can be cmyk values (referred to as cp, mp, yp, kp) and can be calculated with the following formula (see FIG. 13).

CurrentOut=$f_{icc}$(OutputProfile, B2A, Input)

For example, in a case (a-3) where the device link profile 630 is designated for the color conversion as illustrated in FIG. 12C, an input value Input at each adjustment point P0 is CMYK values (Cp, Mp, Yp, Kp). In this case, the current output value CurrentOut can be cmyk values (cp, mp, yp, kp) and can be calculated with the following formula (see FIG. 13).

CurrentOut=$f_{icc}$(DLProfile, A2B0, Input)

Figure 12E:
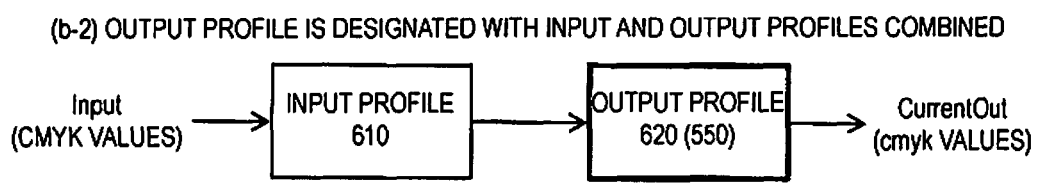

In cases (b-1) and (b-2) where a combination of the profiles 610 and 620 is designated for the color conversion as illustrated in FIGS. 12D and 12E, the input value Input at each adjustment point P0 can be CMYK values (Cp, Mp, Yp, Kp). In this case, the current output value CurrentOut can be cmyk values (cp, mp, yp, kp) and can be calculated with the following formula (see FIG. 13).

CurrentOut=$f_{icc}$(OutputProfile, B2A, $f_{icc}$(InputProfile, A2B, Input))

After the current output value CurrentOut is calculated, the host device 100 calculates a target output value TargetOut for each adjustment point P0 (including the third adjustment point Qx) according to the profile (including a combination of profiles) for color conversion designated in the profile selection fields 811 to 813 and the adjustment subject color space CS6 designated in the adjustment subject color space selection field 830 (S306). This is for performing the adjustment with the output color cmyk$_p$, corresponding to the color of the output image IM0 formed on the print substrate ME1, serving as a reference.

Figure 14A:
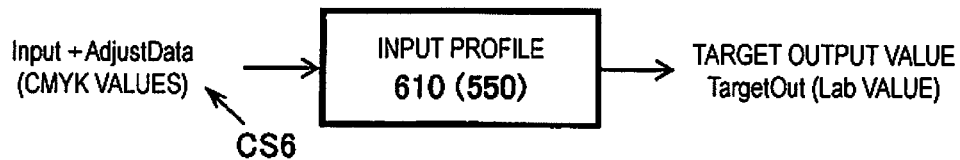
FIGS. 14A to 14D are schematic diagrams illustrating an example where a target output value in accordance with a color space to be adjusted is calculated.

For example, in a case (a-1-1) as illustrated in FIG. 14A where only the input profile 610 is designated for the color conversion and the input color space CS4 is designated for the adjustment subject color space CS6, the adjustment amount AdjustData is added to the CMYK values (Cp, Mp, Yp, Kp) in the CMYK color space. The adjustment amount AdjustData is represented by relative values (ΔCp, ΔMp, ΔYp, ΔKp). In the CMYK color space, the CMYK values after the adjustment is represented by (Cp+ΔCp, Mp+ΔMp, Yp+ΔYp, Kp+ΔKp). The target output value TargetOut can be calculated with the following Formula (see FIG. 16).

TargetOut=$f_{icc}$(InputProfile, A2B, Input+AdjustData)

Figure 14B:
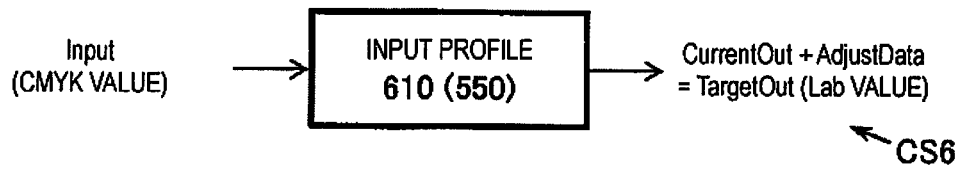

In a case (a-1-2) as illustrated in FIG. 14B where the input profile 610 is designated for the color conversion and the output color space CS5 is designated for the adjustment subject color space CS6, the adjustment amount AdjustData is added to the Lab values (Lp, ap, bp) in the Lab color space. The adjustment amount AdjustData is represented by relative values (ΔLp, Δap, Δbp). In the Lab color space, the Lab values after the adjustment is represented by (Lp+ΔLp, ap+Δap, bp+Δbp). The target output value TargetOut can be calculated with the following formula (see FIG. 16).

TargetOut=$f_{icc}$(InputProfile, A2B, Input)+AdjustData

Figure 14C:
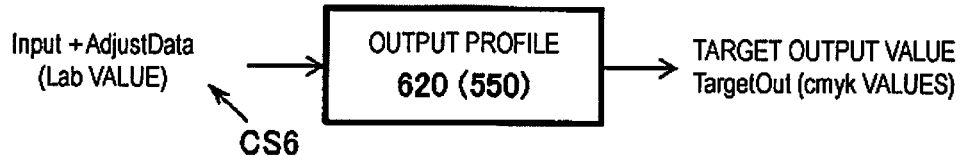

In a case (a-2-1) as illustrated in FIG. 14C where the output profile 620 is designated for the color conversion and the input color space CS4 is designated for the adjustment subject color space CS6, the adjustment amount AdjustData is added to the Lab values (Lp, ap, bp) in the Lab color space. The adjustment amount AdjustData is represented by relative values (ΔLp, Δap, Δbp). In the Lab color space, the Lab values after the adjustment is represented by (Lp+ΔLp, ap+Δap, bp+Δbp). The target output value TargetOut can be calculated with the following formula (see FIG. 16).

TargetOut=$f_{icc}$(OutputProfile, B2A, Input+AdjustData)

Figure 14D:
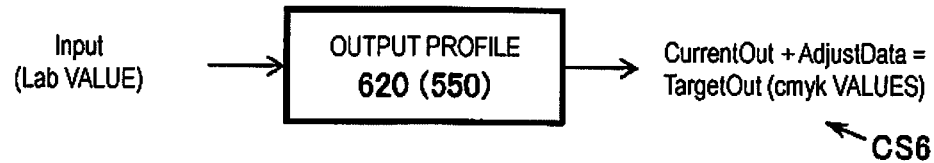

For example, in a case (a-2-2) as illustrated in FIG. 14D where the output profile 620 is designated for the color conversion and the output color space CS5 is designated for the adjustment subject color space CS6, the adjustment amount AdjustData is added to the cmyk values (cp, mp, yp, kp) in the cmyk color space. The adjustment amount AdjustData is represented by relative values (Δcp, Δmp, Δyp, Δkp). In the cmyk color space, the cmyk values after the adjustment is represented by (cp+Δcp, mp+Δmp, yp+Δyp, kp+Δkp). The target output value TargetOut can be calculated with the following formula (see FIG. 16).

TargetOut=$f_{icc}$(OutputProfile, B2A, Input)+AdjustData

In a case (a-3-1) where the device link profile 630 is designated for color conversion and the input color space CS4 is designated as the adjustment subject subject color space CS6, the target output value TargetOut can be calculated with the following formula (see FIG. 16).

TargetOut=$f_{icc}$(DLProfile, A2B0, Input+AdjustData)

In a case (a-3-2) where the device link profile 630 is designated for color conversion and the output color space CS5 is designated as the adjustment subject color space CS6, the target output value TargetOut can be calculated with the following formula (see FIG. 16).

TargetOut=$f_{icc}$(DLProfile, A2B0, Input)+AdjustData

Although not elaborated in the figure, the Lab color space may be designated as the adjustment subject color space CS6. For example, the target output value TargetOut can be calculated by referring to the output profile used for generating the device link profile 630.

For example, in a case (b-1-1) as illustrated in FIG. 15A where a combination of the profiles 610 and 620 is designated for the color conversion and the input color space CS4 is designated as the adjustment subject color space CS6, the adjustment amount AdjustData is added to the CMYK values (Cp, Mp, Yp, Kp) in the CMYK color space. The adjustment amount AdjustData is represented by relative values (ΔCp, ΔMp, ΔYp, ΔKp). In the CMYK color space, the CMYK values after the adjustment is represented by (Cp+ΔCp, Mp+ΔMp, Yp+ΔYp, Kp+ΔKp). The target output value TargetOut can be calculated with the following formula (see FIG. 16).

TargetOut=$f_{icc}$(OutputProfile, B2A, $f_{icc}$(InputProfile, A2B, Input+AdjustData))

This formula holds true also when the output profile 620 is the adjustment subject profile 550.

For example, in a case (b-1-2) as illustrated in FIG. 15B where a combination of the profiles 610 and 620 is designated for the color conversion and the output color space CS5 of the output profile 620 is designated as the adjustment target subject color space CS6, the adjustment amount AdjustData is added to the cmyk values (cp, mp, yp, kp) in the cmyk color space. The adjustment amount AdjustData is represented by relative values (Δcp, Δmp, Δyp, Δkp). In the cmyk color space, the cmyk values after the adjustment is represented by (cp+Δcp, mp+Δmp, yp+Δyp, kp+Δkp). The target output value TargetOut can be calculated with the following formula (see FIG. 16).

TargetOut=$f_{icc}$(OutputProfile, B2A, $f_{icc}$(InputProfile, A2B, Input))+AdjustData This formula holds true also when the output profile 620 is the adjustment subject profile 550.

In a case (b-3-1) as illustrated in FIG. 15C where a combination of the profiles 610 and 620 is designated for the color conversion and the PCS (CS3) is designated as the adjustment subject color space CS6, the adjustment amount AdjustData is added to the Lab values (Lp, ap, bp) in the Lab color space. The adjustment amount AdjustData is represented by relative values (ΔLp, Δap, Δbp). In the Lab color space, the Lab values after the adjustment is represented by (Lp+ΔLp, ap+Δap, bp+Δbp). The target output value TargetOut can be calculated with the following formula (see FIG. 16).

TargetOut=$f_{icc}$(OutputProfile, B2A, $f_{icc}$(InputProfile, A2B, Input)+AdjustData)

This formula holds true also when the output profile 620 is the adjustment subject profile 550.

The calculation of the target output value TargetOut can be omitted when the output coordinate value represents the adjustment target T0.

After the target output value TargetOut is calculated, the host device 100 acquires the input value Input_P and the adjustment subject value TargetOut_P in the adjustment target profile 550 for each adjustment point P0 (S308). This is for adjusting the correspondence relationship between the input value and the output value in the adjustment subject profile 550.

In the case (a-1), (a-2), or (a-3), where one of the profiles 610, 620, and 630 is selected for the color conversion, the designated profile serves as the adjustment subject profile 550. Thus, the input value Input of the designated profile is used as the input value Input_P in the adjustment subject profile 550 and the target output value TargetOut of the designated profile is used as the adjustment target value TargetOut_P in the adjustment subject profile 550 (see FIG. 18).

Input_P=Input

TargetOut_P=TargetOut

The current output value CurrentOut_P in the adjustment subject profile 550 is the current output value CurrentOut of the designated profile.

CurrentOut_P=CurrentOut

Furthermore, TargetOut_P−CurrentOut_P holds true where the output color space CS5 of the adjustment subject profile 550 represents the relative value of the adjustment target T0.

Figure 17A:
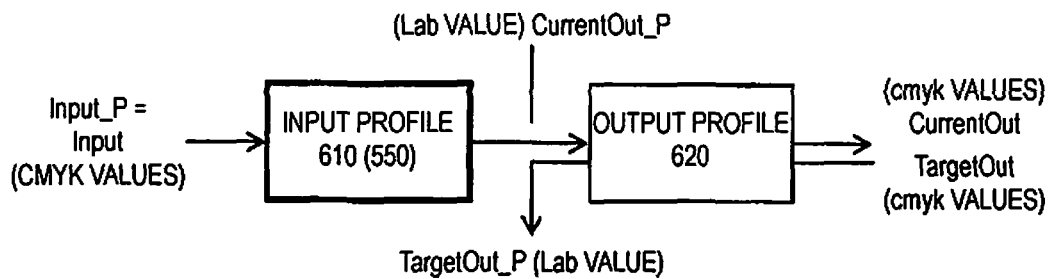
FIGS. 17A and 17B are schematic diagrams illustrating an example where an input value and an adjustment target value of a profile to be adjusted are calculated.

In the case (b-1) as illustrated in FIG. 12D, the input value Input as the combination of the profiles 610 and 620 is used as the input value Input_P in the adjustment subject profile 550 as illustrated in FIG. 17A. The adjustment target value TargetOut_P (Lab values) of the adjustment subject profile 550 can be calculated from the target output value TargetOut serving as cmyk values (see FIG. 18).

Input_P=Input

TargetOut_P=$f_{icc}$(OutputProfile, A2B, TargetOut)

The adjustment target value TargetOut_P (Lab values) of the adjustment subject profile 550 is obtained from the target output value TargetOut (cmyk values) for performing adjustment using the output color cmyk$_p$, corresponding to the color of the output image IM0, as a reference.

The following formula represents the current output value CurrentOut_P (Lab values) in the adjustment subject profile 550.

CurrentOut_P=$f_{icc}$(InputProfile,A2B,Input)

Furthermore, TargetOut_P−CurrentOut_P holds true where the output color space CS5 of the adjustment subject profile 550 represents the relative value of the adjustment target T0.

Figure 17B:
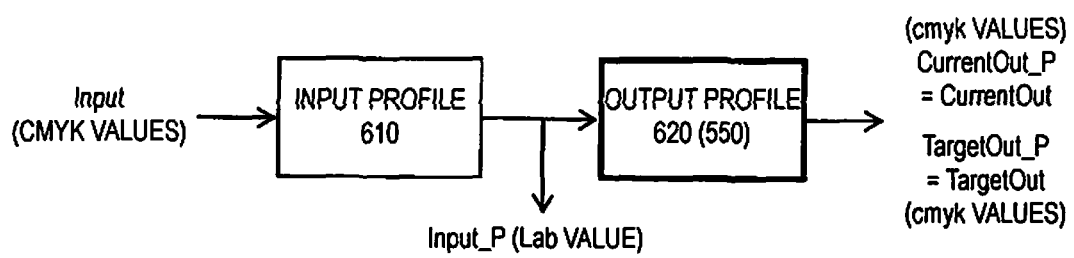

In the case (b-2) illustrated in FIG. 12E, the target output value TargetOut as the combination of the profiles 610 and 620 is used as the adjustment target value TargetOut_P in the adjustment subject profile 550, as illustrated in FIG. 17B. The input value Input_P (Lab values) of the adjustment subject profile 550 can be calculated from the input value Input (CMYK values) serving as CMYK values (see FIG. 18).

Input_P=$f_{icc}$(InputProfile, A2B, Input)

TargetOut_P=TargetOut

The current output value CurrentOut_P (cmyk values) in the adjustment subject profile 550 is the current output value CurrentOut of the combination of the profiles 610 and 620.

CurrentOut_P=CurrentOut

Furthermore, TargetOut_P−CurrentOut_P holds true where the output color space CS5 of the adjustment subject profile 550 represents the relative value of the adjustment target T0.

After the input value Input_P and the adjustment target value TargetOut_P in the adjustment target profile 550 are acquired, the host device 100 adjusts the adjustment range A0 of the adjustment subject profile 550 based on the adjustment target T0, in S310 to S312.

Figure 19A:
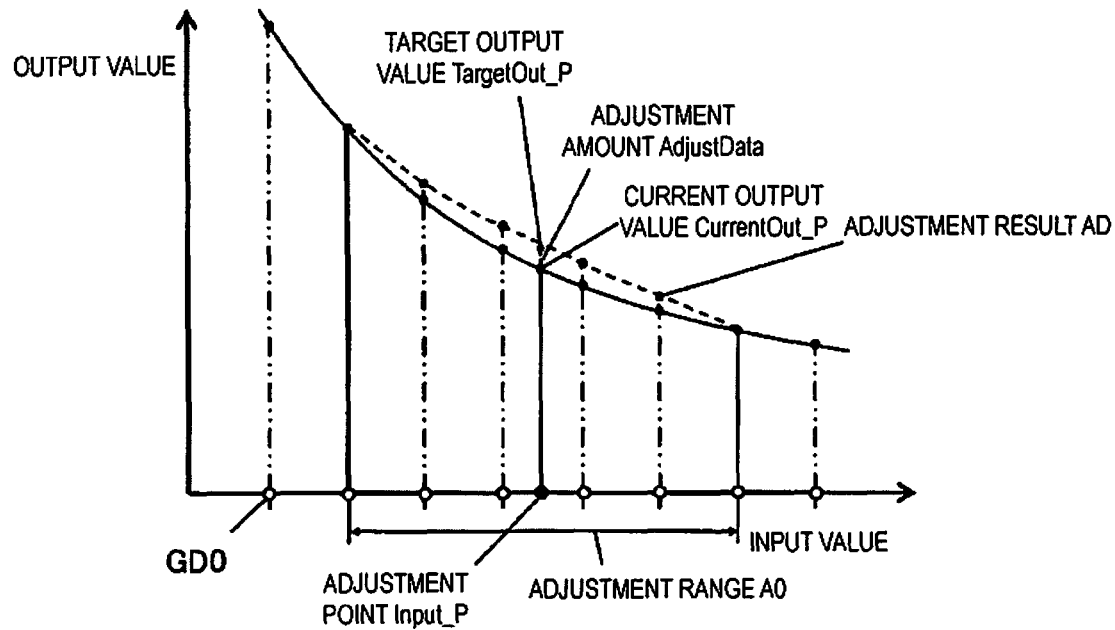
FIG. 19A is a schematic diagram illustrating an adjustment amount for each grid point in a case where an adjustment is performed in an output color space of the profile to be adjusted.
Figure 19B:
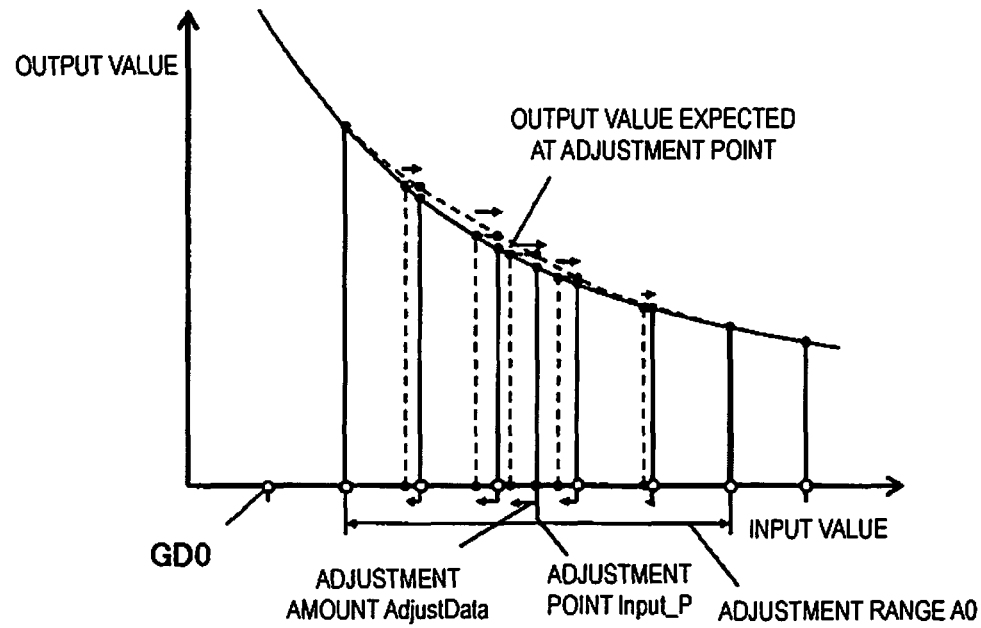
FIG. 19B is a schematic diagram illustrating an adjustment amount for each grid point in a case where an adjustment is performed in an input color space of the profile to be adjusted.

First of all, a concept of adjustment for the adjustment subject profile 550 in the adjustment range A0 is described with reference to FIGS. 19A and 19B. In FIGS. 19A and 19B, the horizontal value represents input values along a coordinate axis of the input color space CS4, and the vertical axis represents output values along a coordinate axis of the output color space CS5. For example, when the input color space CS4 is the CMYK color space, the horizontal axis corresponds to the C axis, the M axis, the Y axis, or the K axis. When the output color space CS5 is the Lab color space, the vertical axis corresponds to the L axis, the a-axis, or the b-axis. White circles on the horizontal axis represent the grid points GD0.

FIG. 19A schematically illustrates an example of the adjustment amount AD for each grid point GD0 in a case where the output value is adjusted. The adjustment point P0 corresponds to the input value Input_P. When the adjustment amount AdjustData is given as the adjustment target T0, the adjustment target value TargetOut_P obtained by adding the adjustment amount AdjustData to the current output value CurrentOut_P corresponding to the input value Input_P is set. In a case where the adjustment subject color space CS6 is the cmyk color space, the current output value CurrentOut_P and adjustment target value TargetOut_P are represented by cmyk values, and the adjustment amount AdjustData is represented by relative values (Δcp, Δmp, Δyp, Δkp) of the cmyk values. In a case where the adjustment subject color space CS6 is the Lab color space, the current output value CurrentOut_P and the adjustment target value TargetOut_P are represented by Lab values, and the adjustment amount AdjustData is represented by relative values (ΔLp, Δap, Δbp) of the Lab values.

The adjustment range A0 is set to the adjustment amount AdjustData according to inputs to the list 700 illustrated in FIG. 5 and the process in S124 in FIG. 4. Basically, the adjustment amount of the output value relative to the input value Input_P is set to be a maximum value and is set to be 0 at the boundary of the adjustment range A0. It is to be noted that the actual adjustment is performed on the grid point GD0 of the adjustment subject profile 550, and thus might influence a range larger than the adjustment range A0 set.

FIG. 19B schematically illustrates an example of the adjustment amount AD for each grid point GD0 in a case where the input value is adjusted. The adjustment point P0 corresponds to the input value Input_P. When the adjustment amount AdjustData is set as the adjustment target T0, the output value expected at the adjustment point P0 is an output value corresponding to the input value Input_P+AdjustData obtained by adding the adjustment amount AdjustData to the input value Input_P. Logically, in a case where the adjustment subject color space CS6 is the CMYK color space, the input value Input_P is represented by CMYK values and the adjustment amount AdjustData is represented by relative values (ΔCp, ΔMp, ΔYp, ΔKp) of CMYK values. If the adjustment subject color space CS6 is the Lab color space, the input value Input_P is represented by Lab values and the adjustment amount AdjustData is represented by relative values (ΔLp, Δap, Δbp) of Lab values.

The correction described above is performed on all of the coordinate axis of the input color space CS4 and on all of the coordinate values in the output color space CS5.

Figure 20A:
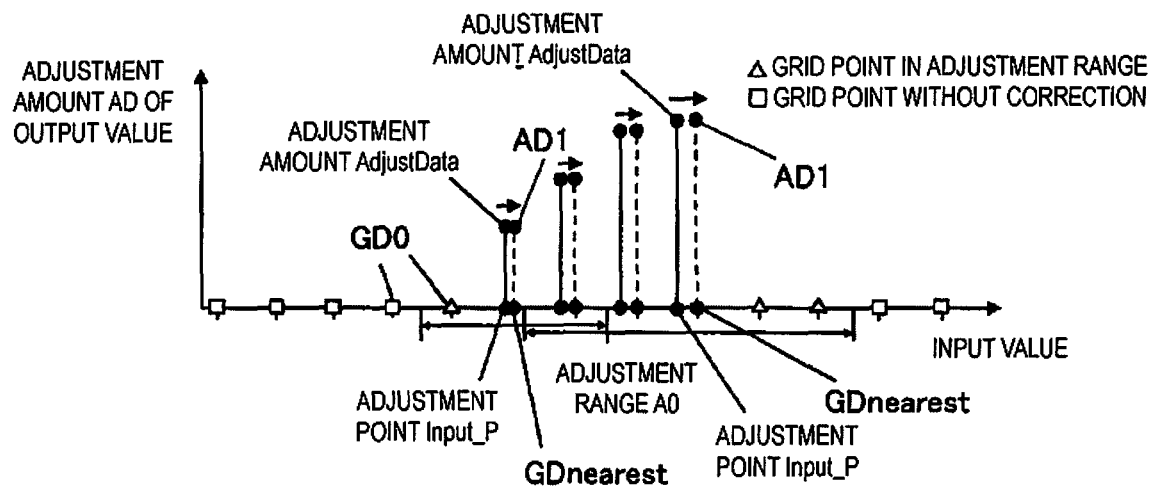
FIG. 20A is a schematic diagram illustrating an example where an adjustment amount for an output value corresponding to the nearest grid point is determined.
Figure 20B:
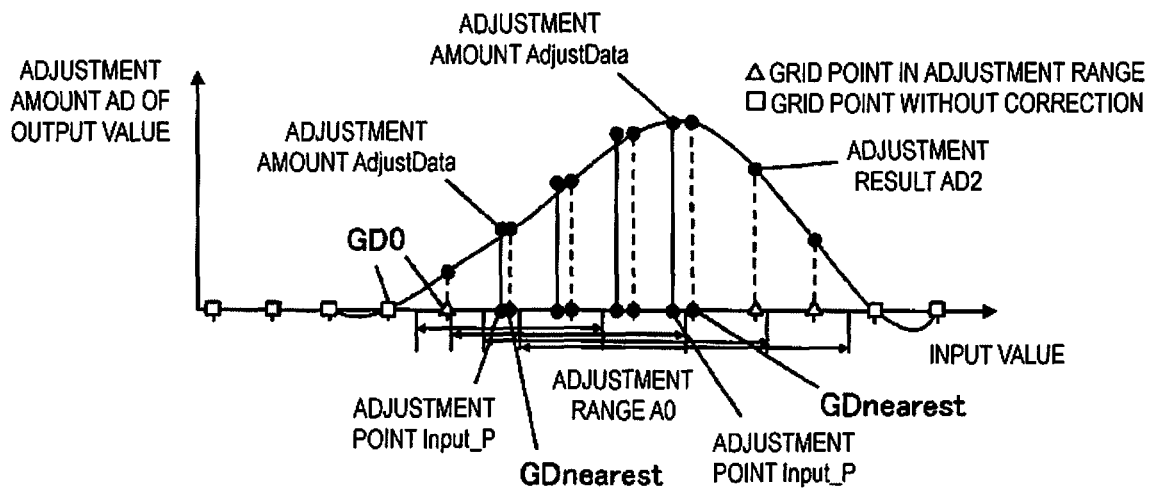
FIG. 20B is a schematic diagram illustrating an example where an adjustment amount for an output value corresponding to a grid point in the periphery of the nearest grid point is determined.

Next, an example where the adjustment amount AD is set for each grid point GD0 of the adjustment range A0 is described with reference to FIGS. 20A and 20B. In FIGS. 20A and 20B, the horizontal axis represents input values and the vertical axis represents the adjustment amount AD for the output value. Triangle marks on the horizontal axis represent grid points (excluding a nearest grid point GDnearest) within the adjustment range A0 and rectangle marks on the horizontal axis represent grid point, outside the adjustment range A0, for which the output value is not corrected.

First, as illustrated in FIG. 20A, the host device 100 determines an adjustment amount AD1 for an output value corresponding to the nearest grid point GDnearest that is a grid point closest to the adjustment point P0, for each adjustment point P0 (S310 in FIG. 7). FIG. 20A illustrates an example where the adjustment amount AD1 for the output value in a case where there are four adjustment points P0 (input values Input_P) on a coordinate axis of the input color space CS4. In the example illustrated in FIG. 20A, the adjustment amount AdjustData for the input value Input_P is directly set as the adjustment amount AD1 for the output value for the nearest grid point GDnearest. However, the technique in the disclosure is not limited to this.

After the adjustment amount AD1 for the output value for the nearest grid point GDnearest is determined, as illustrated in FIG. 20B, the host device 100 determines an adjustment amount AD2 for an output value for a gird point (a grid point with a triangle mark) in the periphery of the nearest grid point GDnearest in the adjustment range A0 (S312 in FIG. 7). For example, the adjustment amount AD2 for an output value for the peripheral gird point can be determined by performing interpolation calculation using three- or four-dimensional cubic spline function, with the adjustment amount for an output value for a grid point outside the adjustment range A0 set to be 0 and the adjustment amount AD1 for the output value for each nearest grid point GDnearest described above set to be AdjustData. Here, in a case where the input color space CS4 is the CMYK color space, the interpolation calculation using the four-dimensional cubic spline function may be performed. In a case where the input color space CS4 is the Lab color space, the interpolation calculation using the three-dimensional cubic spline function may be performed. The present technique is not limited to the interpolation calculation using a spline function.

Some user might wish to adjust all the colors in the gradation between the first adjustment point P1 and the second adjustment point P2. When the first adjustment point P1 and the second adjustment point P2 are far from each other in the input color space CS4, the adjustment ranges A1 and A2 of the adjustment points P1 and P2 do not overlap. Thus, when the adjustment amounts AdjustData are set to the adjustment points P1 and P2, the colors between the adjustment points P1 and P2 are unadjusted, and thus might result in an output image with poor gradations. On the other hand, when the adjustment ranges A1 and A2 of the adjustment points P1 and P2 are set to be wide, colors not desired to be adjusted are adjusted. To avoid such a situation, a number of adjustment points and adjustment amounts AdjustData are set between the adjustment points P1 and P2. In a specific example, the third adjustment point Qx is automatically added between the adjustment points P1 and P2 designated to be a pair. The adjustment amount AdjustData and the third adjustment range A3 of the third adjustment point Qx are automatically set. These pieces of adjustment data are also reflected on the adjustment of the profile 500. Thus, an operation load of the operation for improving the gradation of the output image can be reduced.

After determining the adjustment amount AD for the output value for each grid point in the adjustment range A0, the host device 100 reflects the adjustment amount AD thus determined onto each grid point of the adjustment subject profile 550 (S314 in FIG. 7). For example, in a case where the output color space CS5 of the adjustment subject profile 550 is the cmyk color space, an updated output value includes values (cq+Δcq, mq+Δmq, yq+Δyq, kq+Δkq) obtained by adding the adjustment amounts (referred to as Δcq, Δmq, Δyq, Δkq) to the current output value (referred to as cq, mq, yq, kq). In a case where the output color space CS5 of the adjustment subject profile 550 is the Lab color space, the updated output value is obtained as values (Lq+ΔLq, aq+Δaq, bq+Δbq) obtained by adding the adjustment amounts (referred to as ΔLq, Δaq, Δbq) to the current output values (referred to as Lq, aq, bq). Here, the variable q is for identifying a grid point in the adjustment range A0.

In the manner described above, the correspondence relationship of the adjustment subject profile 550 is adjusted to make the current output value CurrentOut close to the target output value TargetOut in the second color space CS2.

After updating the adjustment subject profile 550, the host device 100 obtains the current output value CurrentOut for the adjustment point P0 (including the third adjustment point Qx) by using the updated adjustment subject profile 550 or a combination of profiles including the updated adjustment subject profile 550 (S316). The updated current output value CurrentOut can be calculated by using a formula that is the same as that in the process in S104 described above with reference to FIGS. 12A to 12E and FIG. 13. The host device 100 obtains a difference d between the updated current output value CurrentOut and the target output value TargetOut for each adjustment point P0 (including the third adjustment point Qx) (S318). For example, the difference may be a Euclidean distance between a point corresponding to the output value CurrentOut and a point corresponding to the target output value TargetOut in the output color space CS5 of the adjustment subject profile 550.

Then, the host device 100 determines whether an end condition for the repeated process from S308 to S320 is satisfied (S320). The processes in S308 to S320 are repeated when end condition is not satisfied. For example, the end condition may be satisfied when the differences d obtained for all of the adjustment points P0 are equal to or smaller than a predetermined threshold. The end condition may be satisfied when the processes are repeated for a predetermined number of times.

After the repeated process, as in the example illustrated in FIG. 21, the host device 100 calculates the adjusted Lab values (chroma values) corresponding to each adjustment point P0, and causes the display device 130 to display the list 700 including the Lab values before and after adjustment corresponding to each adjustment value P0 (S322). Then, the process returns to the profile and parameter setting process illustrated in FIG. 4. In a list L10 illustrated in FIG. 21, the Lab values before adjustment are displayed in the before adjustment coordinate display 722 and the Lab values after an adjustment are displayed on the after adjustment coordinate display field 723. For example, in a case where the input profile 610 and the output profile 620 are used for the color conversion, CMYK values may be converted into cmyk values according to the profiles 610 and 620 before adjustment, the cmyk values may be converted in to Lab values according to the output profile 620, and the Lab values may be displayed on the before adjustment coordinate display field 722. A CMYK values may be converted into cmyk values according to the profiles 610 and 620 after adjustments, the cmyk values may be converted in to Lab values according to the output profile 620, and the Lab values may be displayed on the after adjustment coordinate display field 723.

With the process in S322, the change in the Lab values corresponding to the adjustment point P0 before and after the profile adjustment can be recognized, and thus the profile adjustment operation can be more easily performed.

Without the list 700 described above, in editing of the plurality of colors to be adjusted, a lack of consistency occurs. Thus, it may be difficult to catch an overview of the entire editing work. In a specific example, a plurality of colors to be adjusted are edited with the color information displayed in the list 700. Thus, it is easy to catch an overview of the entire editing operation, and a color to be edited can be registered in a short period of time. Furthermore, the color C0 corresponding to the coordinates input for the adjustment point P0 is displayed in association with the coordinates. Thus, a user viewing the display can instinctively recognize the color to be adjusted together with the coordinates of the adjustment point P0. Thus, with this specific example, a plurality of colors to be adjusted can be efficiently and smoothly edited, and thus the profile can be easily adjusted.

5. MODIFICATION EXAMPLE

The disclosure can be modified in various ways.

For example, the output device is not limited to the inkjet printer, and may be an electrophotographic printer such as a laser printer, a three-dimensional printer, a display device, or the like.

The types of the color materials for forming an image is not limited to C, M, Y, and K. Lc, Lm, dark yellow (Dy) with a higher density than Y, orange (Or), green (Gr), light black (Lk) with a lower density than K, and a colorless color material for improving image quality may be included in addition to C, M, Y, and K, The second color space is not limited to the cmyk color space, and may be a CMYK color space, an RGB color space, or the like.

The target device is not limited to the target printer, and may be a display device or the like.

The first color space is not limited to the CMYK color space, and may be a cmyk color space, an RGB color space, or the like.

As examples illustrated in FIGS. 22A and 22B, a displayed portion of the color C0 relative to the list 700 is not limited to the ID display field. FIG. 22A illustrates an example of the list 700 where the color C0 is displayed on the background of the coordinate display field 722 for Lab values. FIG. 22B illustrates an example of the list 700 where the color C0 is displayed entirely over the adjustment point information 710. These cases feature wider color display ranges enabling the color to be instinctively recognized and numerical values to be objectively recognized with the color instinctively recognized without shifting the line of sight. Various types of displaying such as displaying the color C0 on the background of the input field 720 can be employed.

As in an example illustrated in FIG. 23, the color C0 corresponding to the coordinates of the adjustment point may be displayed on the display device 130, in association with identification information ID for identifying the adjustment point P0, separately from the list 700. A color display area 740, where the colors C0 of the adjustment points P0 are accumulated as display patches 41, is provided outside the list 700 illustrated in FIG. 23. Each display patch 741 has an area that is larger than the area of a single field in the list 700, and may be equal to or larger than 1 cm$^2$ that is an area of a square with a length of each side being 1 cm or longer. Each display patch 741 is provided with identification information 742 corresponding to the ID of the ID display field 721. In the process S208 in FIG. 6, the host device 100 may convert the Lab values corresponding to the adjustment point P0 into an RGB value according to the monitor profile 450. Then, the host device 100 may generate display data DD0 for setting the display patch 741 to have a color C0 corresponding to the CMYK values of the input field 720, according to the RGB value, and may output the data to the display device 130. Then, the color C0 corresponding to the CMYK values of the adjustment point P0 is displayed on the display patch 741.

With the display patch 741 being larger than a single field in the list 700, in a specific example, the color C0 is displayed to stand out more than in a case where the color C0 is displayed inside the list 700. Colors are more intuitively and easily recognized.

As an example illustrated in FIG. 24, the color C0 corresponding to the coordinates in the adjustment point information 710 in an operated portion in the list 700 displayed on the display device 130 may be highlighted to stand out (to be distinguished) from the other colors. For example, upon receiving an operation on any field in the ID display field 721 during the repeated process illustrated in FIG. 6, the host device 100 performs a process of providing a mark 743 for emphasizing to a display patch of the color C0 corresponding to the CMYK values in the adjustment point information 710 corresponding to the ID of the field for which the operation has been received. The list 700 illustrated in FIG. 24 represents a state where a field with ID=4 in the ID display field 721 has been operated and thus the background color of the adjustment point information 710 corresponding to ID=4 has changed to a color (for example, gray) indicating a selected state, as well as a state where a frame (mark 743) is provided to the display patch 741 corresponding to ID=4. Thus, the color of the display patch corresponding to ID=4 is distinguished from colors of the other display patches. The color of the mark 743 may be a color different from the color of the corresponding display patch. The mark 743 may have a hue that is substantially opposite to the hue of the corresponding display patch.

With the configuration described above, the relationship between the adjustment point information 710 in the list 700 and the corresponding color C0 can be more easily understood, whereby the profile adjustment operation can be more easily performed. Note that the color C0 corresponding to the coordinates in the adjustment point information 710 at an operated portion may be displayed in a blinking manner, or the color C0 may be displayed in an emphasized manner so it can stand out (distinguished) from the other colors.

As in an example illustrated in FIG. 25, displaying of the list 700 may be controlled in such a manner that the adjustment point information 710 corresponding to the color at the operated portion, in the colors C0 displayed on the display device 130, stands out (is distinguished) from the other pieces of information. For example, upon receiving an operation on any of the display patches 741 in the color display area 740 during the repeated process illustrated in FIG. 6, the host device 100 performs a process of adding information, for distinction from other pieces of information, to the adjustment point information 710 corresponding to the color for which the operation has been received. As a result, the adjustment point information 710 corresponding to the color for which the operation has been received is emphasized to be displayed. The list 700 illustrated in FIG. 25 represents a state where a cursor 744 has been set to the display patch corresponding to ID=4, and thus the color of the background of the adjustment point information 710 corresponding to ID=4 has changed to a color (for example, gray) in the selected state. As a result, the adjustment point information 710 corresponding to ID=4 in the list 700 is distinguished from the other pieces of information.

Also with the configuration described above, the relationship between the adjustment point information 710 in the list 700 and the corresponding color C0 can be more easily understood, whereby the profile adjustment operation can be more easily performed. Note that the adjustment point information 710 at an operated portion may be displayed in a blinking manner to stand out (to be distinguished) from the other pieces of information.

Upon receiving an operation on any of the display patches 741 in the color display area 740, the host device 100 can provide the mark 743 illustrated in FIG. 24 to the display patch 741 for which the operation has been received. During the repeated process illustrated in FIG. 6, the process illustrated in FIG. 24 and the process illustrated in FIG. 25 may both be performed.

Figure 26:
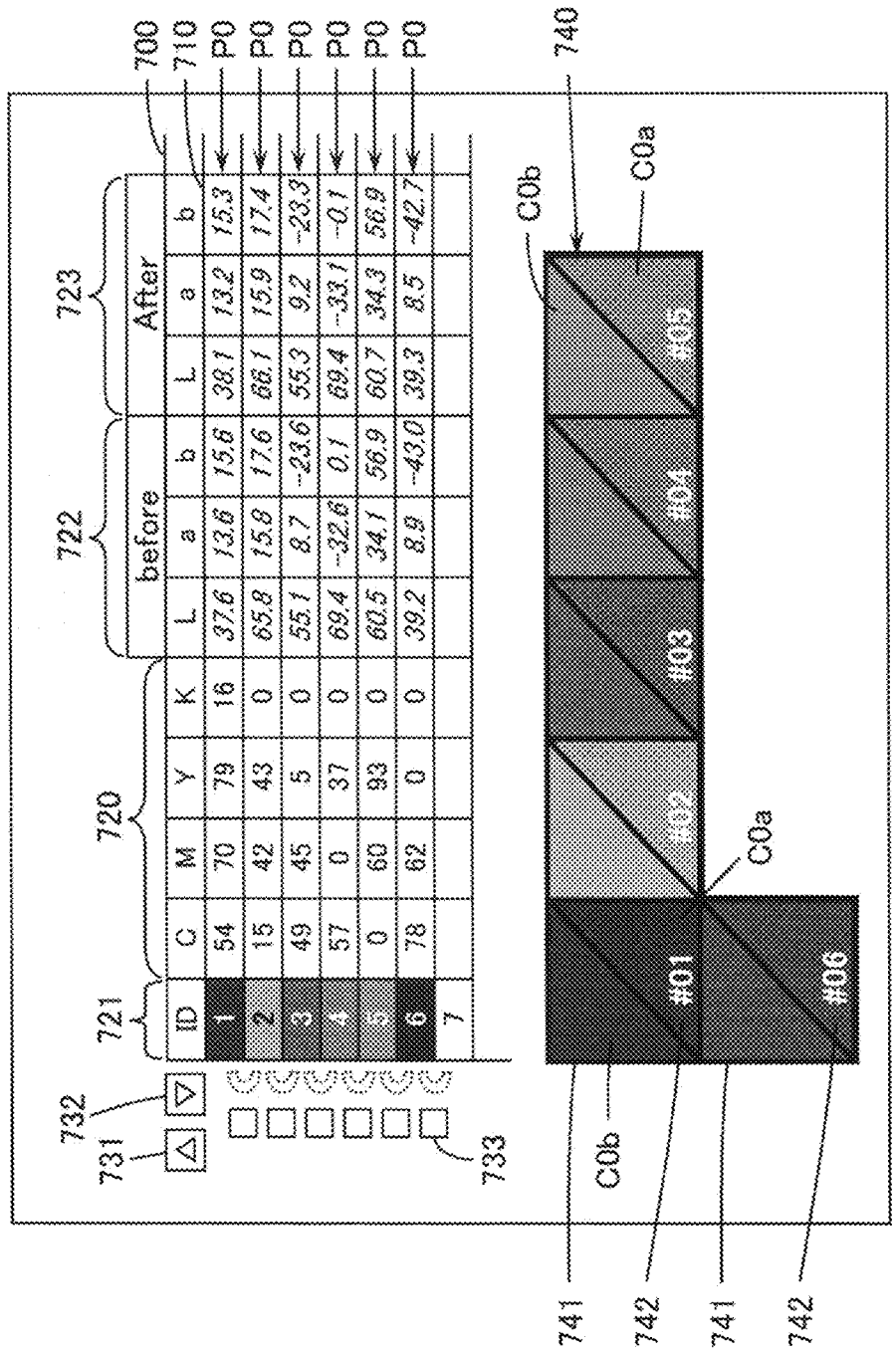
FIG. 26 is a schematic diagram illustrating an example where colors before and after an adjustment are displayed outside the list.

As an example illustrated in FIG. 26, the display patch 741 including the colors C0b and C0a before and after the adjustment corresponding to each adjustment point P0 may be displayed in the color display area 740, in association with the identification information. In the example illustrated in FIG. 26, the color C0b before the adjustment is disposed in an upper left portion of each display patch 741, and the color C0a after an adjustment is displayed in a lower right portion of each display patch 741. For example, in S322 in FIG. 7, the host device 100 may calculate Lab values (chroma values) after adjustment, corresponding to each adjustment point P0, convert the Lab values after adjustment into an RGB value by referring to the monitor profile 450, may generate display data DD0 for the display patch 741 having the color C0b after adjustment together with the color C0a after adjustment, and may output the display data DD0 to the display device 130.

With the configuration described above, the change in the Lab values corresponding to the adjustment point P0 before and after an adjustment operation of the profile can be recognized, and thus the profile adjustment operation can be more easily performed.

Displaying of the colors C0b and C0a before and after adjustment is not limited to the example illustrated in FIG. 26. For example, the color C0b before adjustment may be displayed in a lower right portion of the display patch 741 and the color C0a after adjustment may be displayed in an upper left portion of the display patch 741. The display patch 741 may be displayed in various manners including displaying a circular area of the color C0a after adjustment in the area of the color C0b after adjustment.

Figure 27:
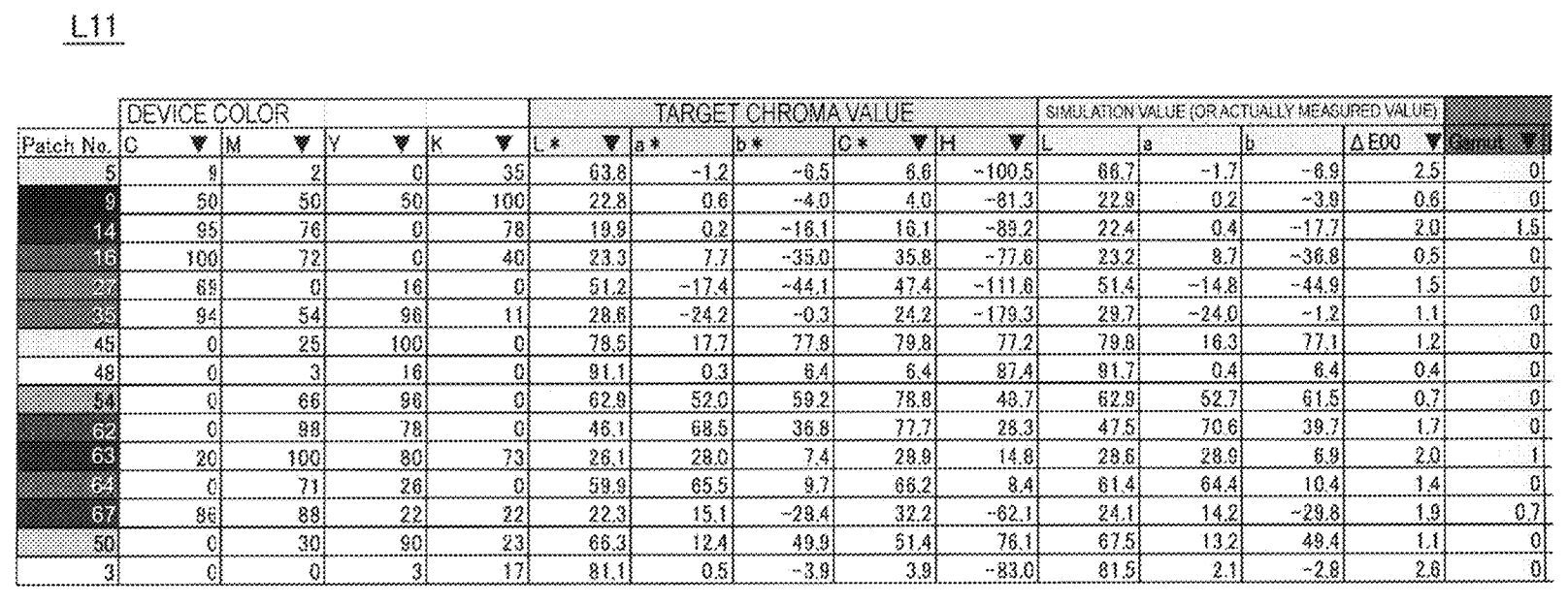
Figure 28:
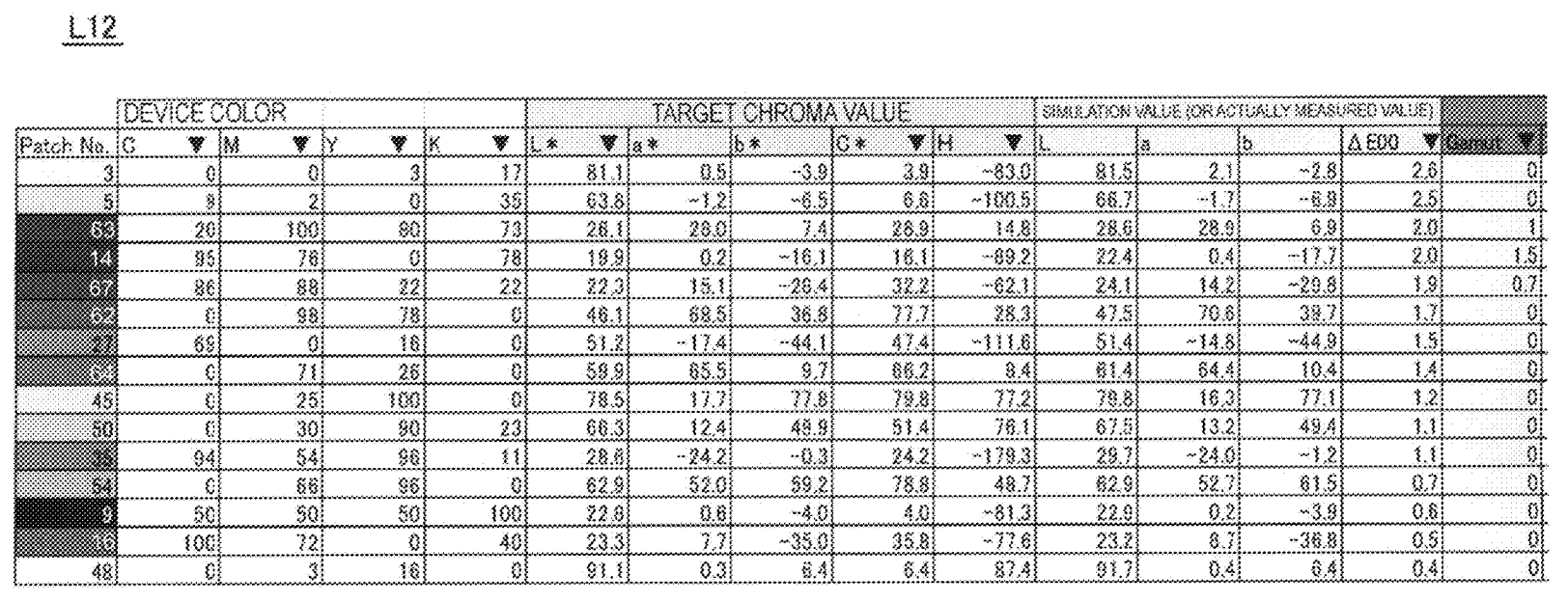

Furthermore, lists L11 to L13 as in examples illustrated in FIGS. 27 to 29 may employ the present technique to sort various items.

The list L11 illustrated in FIG. 27 includes a "Patch No." field corresponding to the ID display field, a "C" field, an "M" field, a "Y" field, and a "K" field corresponding to the input field, an "L*" field, an "a*" field, a "b*" field, a "C*" field, and an "H" field corresponding to the target input field, an "L" field, an "a" field, a "b" field, and a "ΔE00" field corresponding to the coordinate display field, a "Gamut" field indicating whether the adjustment point P0 is within a Gamut, a field for displaying the shortest distance from another adjustment point (not illustrated), a field for displaying a difference between cmyk values before and after adjustment (not illustrated), a field for displaying a difference between Lab values before and after adjustment (not illustrated), and the like. A value in a "C*" field indicates chroma. A value in and "H" field indicates hue. A value in a "ΔE00" field indicates a color difference ΔE00 between a target chroma value and a simulation chroma value or an actually measured chroma value. A value in the "Gamut field" may be 0 to indicate that the point is within a color reproduction range and may be larger than 0 to indicate a distance from the color reproduction range surface. Items with an inversed triangle mark are items that can be sorted. For example, when the user operates the "ΔE00" field, the host device 100 receives the operation and rearranges the adjustment point information piece in a color difference sequence.

The list L12 illustrated in FIG. 28 represents a state where the "ΔE00" field in the list L11 illustrated in FIG. 27 has been operated and the adjustment point information pieces have been sorted in the descending order of the color difference. Then, when the "ΔE00" field is operated in this state, the adjustment point information pieces are sorted in the ascending order of the color difference. Thus, the adjustment point information pieces are rearranged in the descending order or the ascending order of the color difference each time the "ΔE00" field is operated.

The host device 100 may perform any of the following process or a combination of the following processes.

(Process 1) A process of sorting the adjustment point information pieces in a descending or an ascending order of a color difference between the target chroma value and the simulation chroma value or the actually measured chroma value (a value in the "ΔE00" field, for example) and causing the display device 130 to display a result of sorting.

(Process 2) A process of sorting the adjustment point information pieces in a descending or an ascending order of the lightness (the value in the "L*" field, for example), and causing the display device 130 to display a result of sorting.

(Process 3) A process of sorting the adjustment point information pieces in a descending or an ascending order of the hue (the value in the "H*" field, for example), and causing the display device 130 to display a result of sorting.

(Process 4) A process of sorting the adjustment point information pieces in a descending or an ascending order of the chroma (the value in the "C*" field, for example), and causing the display device 130 to display a result of sorting.

(Process 5) A process of sorting the adjustment point information pieces in a descending or an ascending order of the device color (the value in the "C" field, the "M" field, the "Y" field, or the "K" field, for example), and causing the display device 130 to display a result of sorting.

(Process 6) A process of sorting the adjustment point information pieces in a descending or an ascending order of the distance from the color reproduction range surface (the value in the "Gamut" field, for example), and causing the display device 130 to display a result of sorting.

(Process 7) A process of sorting the adjustment point information pieces in a descending or an ascending order of the shortest distance between the adjustment point corresponding to the adjustment point information and another adjustment point (not illustrated), and causing the display device 130 to display a result of sorting.

(Process 8) A process of sorting the adjustment point information pieces in a descending or an ascending order of the difference between the cmyk values before and after adjustment (not illustrated), and causing the display device 130 to display a result of sorting.

(Process 9) A process of sorting the adjustment point information pieces in a descending or an ascending order of the difference between the Lab values before and after the adjustment (not illustrated), and causing the display device 130 to display a result of sorting.

For example, when the processes 1 and 6 are combined, a result of sorting the adjustment point information pieces in the descending order of the color difference ΔE00 under a condition of being within the color reproduction range, as in a list L13 illustrated in FIG. 29.

6. SUPPLEMENT

As described above, the disclosure can provide a technique and the like for facilitating an adjustment operation for a profile used for converting a coordinate value in a color space in various aspects. It is noted that the technique consisting of the components in any of the independent claims can achieve the above-described basic operations and advantageous effects.

Furthermore, a configuration in which individual configurations disclosed in any of the above-described examples are replaced with each other or combined in another way, a configuration in which individual configurations disclosed in a known technique and any of the above-described examples are replaced with each other or combined in another way, and the like are also possible. The disclosure includes these configurations and the like.

This application claims priority under 35 U.S.C. § 119 to Japanese Patent Application No. 2017-160213, filed Aug. 23 2017. The entire disclosure of Japanese Patent Application No. 2017-160213 is hereby incorporated herein by reference.

What is claimed is:

1. A profile adjustment system adjusting a profile used to convert a coordinate value in a color space, based on an adjustment target at an adjustment point indicating a color to be adjusted, the profile adjustment system comprising:
a processor configured to execute a plurality of units including
a coordinate receiving unit configured to display on a display device an input field for coordinates of the adjustment point, and to receive an input of the coordinates of the adjustment point, the coordinate receiving unit being configured to display on the display device adjustment point information about the adjustment point in a list including at least the coordinates of the adjustment point; and
a color display processing unit configured to display on the display device a color corresponding to the received coordinates, in association with displaying of the coordinates,
the coordinate receiving unit being further configured to receive an operation for changing a display sequence of the adjustment point information included in the list, and configured to display on the display device the list with the display sequence of the adjustment point information that was changed according to the operation.

2. The profile adjustment system according to claim 1, wherein
the color display processing unit is configured to display the color corresponding to the coordinates on at least a part of a background of the list.

3. The profile adjustment system according to claim 1, wherein
the color display processing unit is configured to display on the display device, separately from the list, the color corresponding to the coordinates of the adjustment point in association with identification information for identifying the adjustment point.

4. The profile adjustment system according to claim 3, wherein
the color display processing unit is configured to display the color corresponding to the coordinates included in the adjustment point information in an operated portion in the list displayed on the display device to be distinguished from another color.

5. The profile adjustment system according to claim 3, wherein
the color display processing unit is configured to control displaying of the list such that the adjustment point information corresponding to a color of an operated portion, in colors corresponding to the coordinates of the adjustment point displayed on the display device, is distinguished from another piece of information.

6. The profile adjustment system according to claim 3, wherein
the processor further includes a profile adjusting unit configured to adjust the profile based on an adjustment target at the adjustment point, and
the color display processing unit is configured to display on the display device the color corresponding to the coordinates of the adjustment point before the profile adjusting unit makes an adjustment, and a color corresponding to the coordinates of the adjustment point after the profile adjusting unit makes the adjustment, in association with the identification information.

7. The profile adjustment system according to claim 1, wherein
the processor further includes a profile adjusting unit configured to adjust the profile based on an adjustment target at the adjustment point, and
the coordinate receiving unit is configured to display on the display device the list including the adjustment point information including a chroma value corresponding to the adjustment point before the profile adjusting unit makes an adjustment and a chroma value corresponding to the adjustment point after adjustment by the profile adjusting unit.

8. The profile adjustment system according to claim 4, wherein
the color display processing unit is configured to control displaying of the list such that the adjustment point information corresponding to a color of an operated portion, in colors corresponding to the coordinates of the adjustment point displayed on the display device, is distinguished from another piece of information.

9. The profile adjustment system according to claim 4, wherein
the processor further includes a profile adjusting unit configured to adjust the profile based on an adjustment target at the adjustment point, and
the color display processing unit is configured to display on the display device a color corresponding to the coordinates of the adjustment point before the profile adjusting unit makes an adjustment, and a color corresponding to the coordinates of the adjustment point before the profile adjusting unit makes the adjustment, in association with the identification information.

10. The profile adjustment system according to claim 5, wherein
the processor further includes a profile adjusting unit configured to adjust the profile based on an adjustment target at the adjustment point, and
the color display processing unit is configured to display on the display device a color corresponding to the coordinates of the adjustment point before the profile adjusting unit makes an adjustment, and a color corresponding to the coordinates of the adjustment point before the profile adjusting unit makes the adjustment, in association with the identification information.

11. A profile adjustment system adjusting a profile used to convert a coordinate value in a color space, based on an adjustment target at an adjustment point indicating a color to be adjusted, the profile adjustment system comprising:
a processor configured to execute a plurality of units including
a coordinate receiving unit configured to display on a display device an input field for coordinates of the adjustment point, and to receive an input of the coordinates of the adjustment point, the coordinate receiving unit being configured to display on the display device adjustment point information about the adjustment point in a list including at least the coordinates of the adjustment point; and a color display processing unit configured to display on the display device a color corresponding to the received coordinates, in association with displaying of the coordinates, the coordinate receiving unit being further configured to receive an operation for linking a first adjustment point at first coordinates and a second adjustment point at second coordinates, from a plurality of the adjustment points displayed in the list, and display on the display device link information indicating that the first adjustment point and the second adjustment point are linked, the processor further including an adjustment point adding unit configured to set a third adjustment point at third coordinates based on the first coordinates and the second coordinates; and a profile adjusting unit configured to adjust the profile based on adjustment data indicating adjustment degrees on the first adjustment point, the second adjustment point, and the third adjustment point.

12. The profile adjustment system according to claim 11, wherein the coordinate receiving unit is configured to receive an operation for changing a display sequence of the adjustment point information included in the list; and display on the display device the list with the display sequence of the adjustment point information that was changed according to the operation.

13. A profile adjustment method for adjusting a profile used to convert a coordinate value in a color space, based on an adjustment target at an adjustment point indicating a color to be adjusted, the profile adjustment method comprising:

displaying on a display device an input field for coordinates of the adjustment point indicating the color to be adjusted and receiving an input of the coordinates of the adjustment point;

displaying on the display device a color corresponding to the received coordinates, in association with displaying of the coordinates;

displaying on the display device adjustment point information about the adjustment point in a list including at least the coordinates of the adjustment point;

receiving an operation for changing a display sequence of the adjustment point information included in the list; and displaying on the display device the list with the display sequence of the adjustment point information that was changed according to the operation.

14. A profile adjustment method for adjusting a profile used to convert a coordinate value in a color space, based on an adjustment target at an adjustment point indicating a color to be adjusted, the profile adjustment method comprising:

displaying on a display device an input field for coordinates of the adjustment point indicating the color to be adjusted and receiving an input of the coordinates of the adjustment point;

displaying on the display device a color corresponding to the received coordinates, in association with displaying of the coordinates;

displaying on the display device adjustment point information about the adjustment point in a list including at least the coordinates of the adjustment point;

receiving an operation for linking a first adjustment point at first coordinates and a second adjustment point at second coordinates, from a plurality of the adjustment points displayed in the list;

displaying on the display device link information indicating that the first adjustment point and the second adjustment point are linked;

setting a third adjustment point at third coordinates based on the first coordinates and the second coordinates; and adjusting the profile based on adjustment data indicating adjustment degrees on the first adjustment point, the second adjustment point, and the third adjustment point.

* * * * *